US012165662B2

(12) United States Patent
Schnell et al.

(10) Patent No.: US 12,165,662 B2
(45) **Date of Patent: *Dec. 10, 2024**

(54) DOWNSCALED DECODING

(71) Applicant: Fraunhofer-Gesellschaft zur Foerderung der angewandten Forschung e.V., Munich (DE)

(72) Inventors: Markus Schnell, Nuremberg (DE); Manfred Lutzky, Nuremberg (DE); Eleni Fotopoulou, Nuremberg (DE); Konstantin Schmidt, Nuremberg (DE); Conrad Benndorf, Nuremberg (DE); Adrian Tomasek, Zirndorf (DE); Tobias Albert, Roedelsee (DE); Timon Seidl, Schwabach (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/195,213

(22) Filed: May 9, 2023

(65) Prior Publication Data

US 2023/0360656 A1 Nov. 9, 2023

Related U.S. Application Data

(63) Continuation of application No. 17/367,037, filed on Jul. 2, 2021, now Pat. No. 11,670,312, which is a (Continued)

(30) Foreign Application Priority Data

Jun. 16, 2015 (EP) .................................... 15172282
Oct. 12, 2015 (EP) .................................... 15189398

(51) Int. Cl.
*G10L 19/00* (2013.01)
*G10L 19/02* (2013.01)
*G10L 19/022* (2013.01)

(52) U.S. Cl.
CPC ........ *G10L 19/0212* (2013.01); *G10L 19/022* (2013.01)

(58) Field of Classification Search
CPC .............................. G10L 19/03; G10L 19/032
See application file for complete search history.

(56) References Cited

U.S. PATENT DOCUMENTS 5,729,556 A 3/1998 Benbassat et al.
6,092,041 A 7/2000 Pan et al.

(Continued)

FOREIGN PATENT DOCUMENTS

CN 1484822 A 3/2004
CN 1669073 A 9/2005

(Continued)

OTHER PUBLICATIONS

Chen, Juin-Hwey, "A High-Fidelity Speech and Audio Codec with Low Delay and Low Complexity", IEEE International Conference On Acoustics, Speech And Signal Processing; May 26-31, 2013XP055294519, vol. 2.

(Continued)

*Primary Examiner* — Daniel Abebe
(74) *Attorney, Agent, or Firm* — Perkins Coie LLP; Michael A. Glenn

(57) ABSTRACT

A downscaled version of an audio decoding procedure may more effectively and/or at improved compliance maintenance be achieved if the synthesis window used for downscaled audio decoding is a downsampled version of a reference synthesis window involved in the non-downscaled audio decoding procedure by downsampling by the down- (Continued)

FIGURE FOR ABSTRACT sampling factor by which the downsampled sampling rate and the original sampling rate deviate, and downsampled using a segmental interpolation in segments of ¼ of the frame length.

6 Claims, 9 Drawing Sheets

Related U.S. Application Data continuation of application No. 16/549,914, filed on Aug. 23, 2019, now Pat. No. 11,062,719, which is a continuation of application No. 15/843,358, filed on Dec. 15, 2017, now Pat. No. 10,431,230, which is a continuation of application No. PCT/EP2016/063371, filed on Jun. 10, 2016.

(56) References Cited

U.S. PATENT DOCUMENTS

| | | | | |
|---|---|---|---|---|
| 9,520,136 | B2 | 12/2016 | Sung et al. | |
| 9,911,434 | B2 | 3/2018 | Purnhagen et al. | |
| 10,236,007 | B2 | 3/2019 | Disch et al. | |
| 10,515,647 | B2 * | 12/2019 | Villemoes | G10L 19/032 |
| 11,735,192 | B2 * | 8/2023 | Disch | G10L 19/03 704/500 |
| 11,922,956 | B2 * | 3/2024 | Disch | G10L 21/0388 |
| 2002/0007273 | A1 | 1/2002 | Chen | |
| 2003/0088423 | A1 | 5/2003 | Nishio et al. | |
| 2005/0047793 | A1 | 3/2005 | Butler et al. | |
| 2005/0171785 | A1 | 8/2005 | Nomura et al. | |
| 2005/0177360 | A1 | 8/2005 | Schuijers et al. | |
| 2006/0265087 | A1 | 11/2006 | Philippe et al. | |
| 2008/0097764 | A1 | 4/2008 | Grill et al. | |
| 2010/0023322 | A1 | 1/2010 | Schnell et al. | |
| 2010/0057447 | A1 | 3/2010 | Ehara | |
| 2010/0286990 | A1 | 11/2010 | Biswas et al. | |
| 2011/0119055 | A1 | 5/2011 | Lee et al. | |
| 2011/0173011 | A1 | 7/2011 | Geiger et al. | |
| 2011/0307248 | A1 | 12/2011 | Yamanashi et al. | |
| 2012/0245947 | A1 | 9/2012 | Neuendorf et al. | |
| 2012/0265541 | A1 | 10/2012 | Geiger et al. | |
| 2012/0271644 | A1 | 10/2012 | Bessette et al. | |
| 2013/0030798 | A1 * | 1/2013 | Mittal | G10L 19/20 704/219 |
| 2013/0030819 | A1 * | 1/2013 | Purnhagen | G10L 19/008 704/500 |
| 2014/0142957 | A1 * | 5/2014 | Sung | G10L 19/0204 704/500 |
| 2015/0025896 | A1 | 1/2015 | Purnhagen et al. | |
| 2015/0163614 | A1 | 6/2015 | Radhakrishnan et al. | |
| 2016/0372123 | A1 | 12/2016 | Kjoerling et al. | |
| 2018/0247660 | A1 | 8/2018 | Purnhagen et al. | |
| 2019/0267016 | A1 | 8/2019 | Disch et al. | |

FOREIGN PATENT DOCUMENTS

| | | | |
|---|---|---|---|
| CN | 1677492 | A | 10/2005 |
| CN | 1890712 | A | 1/2007 |
| CN | 101351840 | A | 1/2009 |
| CN | 101405791 | A | 4/2009 |
| CN | 102089758 | A | 6/2011 |
| CN | 102334159 | A | 1/2012 |
| CN | 102419978 | A | 4/2012 |
| CN | 103531203 | A | 1/2014 |
| CN | 103632674 | A | 3/2014 |
| CN | 104078048 | A | 10/2014 |
| CN | 104488026 | A | 4/2015 |
| EP | 0918407 | A2 | 5/1999 |
| EP | 0957580 | A1 | 11/1999 |
| EP | 2378516 | B1 | 1/2015 |
| JP | 2006119363 | A | 5/2006 |
| JP | 2009530675 | A | 8/2009 |
| JP | 2014013408 | A | 1/2014 |
| JP | 2014059570 | A | 4/2014 |
| RU | 2325046 | C2 | 5/2008 |
| RU | 2456682 | C2 | 7/2012 |
| TH | 118128 | | 11/2012 |
| TH | 128687 | | 10/2013 |
| TH | 136424 | | 9/2014 |
| TW | 201230010 | A | 7/2012 |
| WO | 2005055203 | A1 | 6/2005 |
| WO | 2007051548 | A1 | 5/2007 |
| WO | 2008049590 | A1 | 5/2008 |
| WO | 2011147950 | A1 | 12/2011 |
| WO | 2012048472 | A1 | 4/2012 |
| WO | 2013068634 | A1 | 5/2013 |
| WO | 2013142650 | A1 | 9/2013 |
| WO | 2014056705 | A1 | 4/2014 |
| WO | 2014128197 | A1 | 8/2014 |
| WO | 2016062869 | A1 | 4/2016 |

OTHER PUBLICATIONS

Deng, Feng, et al., "[Part 1 of 2] Audio Enhancement in Compressed Domain Based on MPEG-AAC Codec", Acta Electronica Sinica, vol. 42, No. 7, Jul. 2014, p. 1410-1418, pp. 1410-1418.

Deng, Feng, et al., "[Part 2 of 2] Audio Enhancement in Compressed Domain Based on MPEG-AAC Codec", Acta Electronica Sinica, vol. 42, No. 7, Jul. 2014, p. 1410-1418, pp. 1410-1418.

ETSI TS 126 445 V12.0.0, "Evs Codec Detailed Algorithmic Description (Part 1 of 3)", (3GPP TS 26.445 version 12.0.0 Release 12), Nov. 2014.

ETSI TS 126 445 V12.0.0, "Evs Codec Detailed Algorithmic Description (Part 2 of 3)", (3GPP TS 26.445 version 12.0.0 Release 12), Nov. 2014.

ETSI TS 126 445 V12.0.0, "EVS Codec Detailed Algorithmic Description (Part 3 of 3)", (3GPP TS 26.445 version 12.0.0 Release 12), Nov. 2014.

ISO/IEC 14496-3:2009(E), "Information technology—Coding of audio-visual objects—", International Standard ISO/IEC 14496-3, 2009, Part 3: Audio, Subpart 4.

M13958, "Proposal for an Enhanced Low Delay Coding Mode", International Organisation for Standardisation Organisation Internationale De Normalisation ISO/IEC JTC1/SC29/WG11 Coding of Moving Pictures and AudioISO/IEC JTC1/SC29/WG11; Hangzhou, China, Oct. 2006, 41 pp.

Schnell, Markus, et al., "Delay-reduced mode of MPEG-4 Enhanced Low Delay AAC (AAC-ELD)", Audio Engineering Society Convention 140Convention Paper 9488, pp. 1-8.

* cited by examiner

FIGURE FOR ABSTRACT

DOWNSCALED DECODING

CROSS-REFERENCE TO RELATED APPLICATIONS

This application is a continuation of copending U.S. patent application Ser. No. 17/367,037 filed Jul. 2, 2021, which is a continuation of U.S. patent application Ser. No. 16/549,914 filed Aug. 23, 2019, which in turn is a continuation of U.S. patent application Ser. No. 15/843,358 filed Dec. 15, 2017, which is a continuation of International Application No. PCT/EP2016/063371, filed Jun. 10, 2016, which is incorporated herein by reference in its entirety, and additionally claims priority from European Application No. EP15172282.4, filed Jun. 16, 2015, and from European Application No. 15189398.9, filed Oct. 12, 2015, which are also incorporated herein by reference in their entirety.

BACKGROUND OF THE INVENTION

The present application is concerned with a downscaled decoding concept.

The MPEG-4 Enhanced Low Delay AAC (AAC-ELD) usually operates at sample rates up to 48 kHz, which results in an algorithmic delay of 15 ms. For some applications, e.g. lip-sync transmission of audio, an even lower delay is desirable. AAC-ELD already provides such an option by operating at higher sample rates, e.g. 96 kHz, and therefore provides operation modes with even lower delay, e.g. 7.5 ms. However, this operation mode comes along with an unnecessary high complexity due to the high sample rate.

The solution to this problem is to apply a downscaled version of the filter bank and therefore, to render the audio signal at a lower sample rate, e.g. 48 kHz instead of 96 kHz. The downscaling operation is already part of AAC-ELD as it is inherited from the MPEG-4 AAC-LD codec, which serves as a basis for AAC-ELD.

The question which remains, however, is how to find the downscaled version of a specific filter bank. That is, the only uncertainty is the way the window coefficients are derived whilst enabling clear conformance testing of the downscaled operation modes of the AAC-ELD decoder.

In the following the principles of the down-scaled operation mode of the AAC-(E)LD codecs are described.

The downscaled operation mode or AAC-LD is described for AAC-LD in ISO/IEC 14496-3:2009 in section 4.6.17.2.7 "Adaptation to systems using lower sampling rates" as follows:

"In certain applications it may be necessary to integrate the low delay decoder into an audio system running at lower sampling rates (e.g. 16 kHz) while the nominal sampling rate of the bitstream payload is much higher (e.g. 48 kHz, corresponding to an algorithmic codec delay of approx. 20 ms). In such cases, it is favorable to decode the output of the low delay codec directly at the target sampling rate rather than using an additional sampling rate conversion operation after decoding.

This can be approximated by appropriate downscaling of both, the frame size and the sampling rate, by some integer factor (e.g. 2, 3), resulting in the same time/frequency resolution of the codec. For example, the codec output can be generated at 16 kHz sampling rate instead of the nominal 48 kHz by retaining only the lowest third (i.e. 480/3=160) of the spectral coefficients prior to the synthesis filterbank and reducing the inverse transform size to one third (i.e. window size 960/3=320).

As a consequence, decoding for lower sampling rates reduces both memory and computational requirements, but may not produce exactly the same output as a full-bandwidth decoding, followed by band limiting and sample rate conversion.

Please note that decoding at a lower sampling rate, as described above, does not affect the interpretation of levels, which refers to the nominal sampling rate of the AAC low delay bitstream payload."

Please note that AAC-LD works with a standard MDCT framework and two window shapes, i.e. sine-window and low-overlap-window. Both windows are fully described by formulas and therefore, window coefficients for any transformation lengths can be determined.

Compared to AAC-LD, the AAC-ELD codec shows two major differences:

The Low Delay MDCT window (LD-MDCT)

The possibility of utilizing the Low Delay SBR tool

The IMDCT algorithm using the low delay MDCT window is described in 4.6.20.2 in [1], which is very similar to the standard IMDCT version using e.g. the sine window. The coefficients of the low delay MDCT windows (480 and 512 samples frame size) are given in Table 4.A.15 and 4.A.16 in [1]. Please note that the coefficients cannot be determined by a formula, as the coefficients are the result of an optimization algorithm. FIG. 9 shows a plot of the window shape for frame size 512.

In case the low delay SBR (LD-SBR) tool is used in conjunction with the AAC-ELD coder, the filter banks of the LD-SBR module are downscaled as well. This ensures that the SBR module operates with the same frequency resolution and, therefore, no more adaptions are implemented.

Thus, the above description reveals that there is a need for downscaling decoding operations such as, for example, downscaling a decoding at an AAC-ELD. It would be feasible to find out the coefficients for the downscaled synthesis window function anew, but this is a cumbersome task, necessitates additional storage for storing the downscaled version and renders a conformity check between the non-downscaled decoding and the downscaled decoding more complicated or, from another perspective, does not comply with the manner of downscaling requested in the AAC-ELD, for example. Depending on the downscale ratio, i.e. the ratio between the original sampling rate and the downscaled sampling rate, one could derive the downscaled synthesis window function simply by downsampling, i.e. picking out every second, third, . . . window coefficient of the original synthesis window function, but this procedure does not result in a sufficient conformity of the non-downscaled decoding and downscaled decoding, respectively. Using more sophisticated decimating procedures applied to the synthesis window function, lead to unacceptable deviations from the original synthesis window function shape. Therefore, there is a need in the art for an improved downscaled decoding concept.

SUMMARY

According to an embodiment, an audio decoder configured to decode an audio signal at a first sampling rate from a data stream into which the audio signal is transform coded at a second sampling rate, the first sampling rate being $1/F^{th}$ of the second sampling rate, may have: a receiver configured to receive, per frame of length N of the audio signal, N spectral coefficients; a grabber configured to grab-out for each frame, a low-frequency fraction of length N/F out of the N spectral coefficients; a spectral-to-time modulator configured to subject, for each frame, the low-frequency fraction to an inverse transform having modulation functions of length (E+2)·N/F temporally extending over the respective frame and E+1 previous frames so as to obtain a temporal portion of length (E+2)·N/F; a windower configured to window, for each frame, the temporal portion using a synthesis window of length (E+2)·N/F having a zero-portion of length ¼·N/F at a leading end thereof and having a peak within a temporal interval of the synthesis window, the temporal interval succeeding the zero-portion and having length 7/4·N/F so that the windower obtains a windowed temporal portion of length (E+2)·N/F; and a time domain aliasing canceler configured to subject the windowed temporal portion of the frames to an overlap-add process so that a trailing-end fraction of length (E+1)/(E+2) of the windowed temporal portion of a current frame overlaps a leading end of length (E+1)/(E+2) of the windowed temporal portion of a preceding frame, wherein the inverse transform is an inverse MDCT or inverse MDST, and wherein the synthesis window is a downsampled version of a reference synthesis window of length (E+2)·N, downsampled by a factor of F by a segmental interpolation in segments of length ¼·N.

Another embodiment may have an audio decoder for generating a downscaled version of a synthesis window of the above inventive audio decoder, wherein E=2 so that the synthesis window function has a kernel related half of length 2·N/F preceded by a reminder half of length 2·N/F and wherein the spectral-to-time modulator, the windower and the time domain aliasing canceler are implemented so as to cooperate in a lifting implementation according to which the spectral-to-time modulator confines the subjecting, for each frame, the low-frequency fraction to the inverse transform having modulation functions of length (E+2)·N/F temporally extending over the respective frame and E+1 previous frames, to a transform kernel coinciding with the respective frame and one previous frame so as to obtain the temporal portion $x_{k,n}$ with n=0 . . . 2M−1 with M=N/F being a sample index and k being a frame index; the windower windowing, for each frame, the temporal portion $x_{k,n}$ according to $z_{k,n}=\omega_n \cdot x_{k,n}$ for n=0, . . . , 2M−1 so as to obtain the windowed temporal portion $z_{k,n}$ with n=0 . . . 2M−1; the time domain aliasing canceler generates intermediate temporal portions $m_k(0)$, . . . $m_k(M-1)$ according to $m_{k,n}=z_{k,n}+z_{k-1,n+M}$ for n=0, . . . , M−1, and the audio decoder has a lifter configured to obtain the frames $u_{k,n}$ with n=0 . . . M−1 according to $u_{k,n}=m_{k,n}+I_{n-M/2}\cdot m_{k-1,M-1-n}$ for n=M/2, . . . , M−1, and $u_{k,n}=m_{k,n}+I_{M-1-n}\cdot out_{k-1,M-1-n}$ for n=0, . . . , M/2−1, wherein $I_n$ with n=0 . . . M−1 are lifting coefficients, and wherein $I_n$ with n=0 . . . M−1 and $\omega_n$ with n=0, . . . , 2M−1 depend on coefficients $\omega_n$ with n=0 . . . (E+2)M−1 of the synthesis window.

According to another embodiment, an audio decoder configured to decode an audio signal at a first sampling rate from a data stream into which the audio signal is transform coded at a second sampling rate, the first sampling rate being $1/F^{th}$ of the second sampling rate, may have: a receiver configured to receive, per frame of length N of the audio signal, N spectral coefficients; a grabber configured to grab-out for each frame, a low-frequency fraction of length N/F out of the N spectral coefficients; a spectral-to-time modulator configured to subject, for each frame, the low-frequency fraction to an inverse transform having modulation functions of length 2·N/F temporally extending over the respective frame and a previous frame so as to obtain a temporal portion of length 2·N/F; a windower configured to window, for each frame, the temporal portion $x_{k,n}$ according to $z_{k,n}=\omega_n \cdot x_{k,n}$ for n=0, . . . , 2M−1 so as to obtain a windowed temporal portion $z_{k,n}$ with n=0 . . . 2M−1; a time domain aliasing canceler configured to generate intermediate temporal portions $m_k(0)$, . . . $m_k(M-1)$ according to $m_{k,n}=z_{k,n}+z_{k-1,n+M}$ for n=0, . . . , M−1, and the lifter configured to obtain frames $u_{k,n}$ of the audio signal with n=0 . . . M−1 according to $u_{k,n}=m_{k,n}+I_{n-M/2}\cdot m_{k-1,M-1-n}$ for n=M/2, . . . , M−1, and $u_{k,n}=m_{k,n}+I_{M-1-n}$ $out_{k-1,m-1-n}$ for n=0, . . . , M/2−1, wherein $I_n$ with n=0 . . . M−1 are lifting coefficients, wherein the inverse transform is an inverse MDCT or inverse MDST, and wherein $I_n$ with n=0 . . . M−1 and $\omega_n$ with n=0, . . . , 2M−1 depend on coefficients $\omega_n$ with n=0 . . . (E+2)M−1 of a synthesis window, and the synthesis window is a downsampled version of a reference synthesis window of length 4·N, downsampled by a factor of F by a segmental interpolation in segments of length ¼ ·N.

Another embodiment may have an apparatus for generating a downscaled version of a synthesis window of one of the above inventive audio decoders, wherein the apparatus is configured to downsample a reference synthesis window of length (E+2)·N by a factor of F by a segmental interpolation in 4·(E+2) segments of equal length.

Still another embodiment may have a method for generating a downscaled version of a synthesis window of one of the above inventive audio decoders, wherein the method has downsampling a reference synthesis window of length (E+2)·N by a factor of F by a segmental interpolation in 4·(E+2) segments of equal length.

According to another embodiment, a method for decoding an audio signal at a first sampling rate from a data stream into which the audio signal is transform coded at a second sampling rate, the first sampling rate being $1/F^{th}$ of the second sampling rate, may have the steps of: receiving, per frame of length N of the audio signal, N spectral coefficients; grabbing-out for each frame, a low-frequency fraction of length N/F out of the N spectral coefficients; performing a spectral-to-time modulation by subjecting, for each frame, the low-frequency fraction to an inverse transform having modulation functions of length (E+2)·N/F temporally extending over the respective frame and E+1 previous frames so as to obtain a temporal portion of length (E+2)·N/F; windowing, for each frame, the temporal portion using a synthesis window of length (E+2)·N/F having a zero-portion of length ¼·N/F at a leading end thereof and having a peak within a temporal interval of the synthesis window, the temporal interval succeeding the zero-portion and having length 7/4·N/F so that the windower obtains a windowed temporal portion of length (E+2)·N/F; and performing a time domain aliasing cancellation by subjecting the windowed temporal portion of the frames to an overlap-add process so that a trailing-end fraction of length (E+1)/(E+2) of the windowed temporal portion of a current frame overlaps a leading end of length (E+1)/(E+2) of the windowed temporal portion of a preceding frame, wherein the inverse transform is an inverse MDCT or inverse MDST, and wherein the synthesis window is a downsampled version of a reference synthesis window of length (E+2)·N, downsampled by a factor of F by a segmental interpolation in segments of length ¼·N.

Another embodiment may have a non-transitory digital storage medium having stored thereon a computer program for performing the above inventive methods, when said computer program is run by a computer.

The present invention is based on the finding that a downscaled version of an audio decoding procedure may more effectively and/or at improved compliance maintenance be achieved if the synthesis window used for downscaled audio decoding is a downsampled version of a reference synthesis window involved in the non-downscaled audio decoding procedure by downsampling by the downsampling factor by which the downsampled sampling rate and the original sampling rate deviate, and downsampled using a segmental interpolation in segments of ¼ of the frame length.

BRIEF DESCRIPTION OF THE DRAWINGS

Embodiments of the present application are described below with respect to the figures, among which.

DETAILED DESCRIPTION OF THE INVENTION

The following description starts with an illustration of an embodiment for downscaled decoding with respect to the AAC-ELD codec. That is, the following description starts with an embodiment which could form a downscaled mode for AAC-ELD. This description concurrently forms a kind of explanation of the motivation underlying the embodiments of the present application. Later on, this description is generalized, thereby leading to a description of an audio decoder and audio decoding method in accordance with an embodiment of the present application.

As described in the introductory portion of the specification of the present application, AAC-ELD uses low delay MDCT windows. In order to generate downscaled versions thereof, i.e. downscaled low delay windows, the subsequently explained proposal for forming a downscaled mode for AAC-ELD uses a segmental spline interpolation algorithm which maintains the perfect reconstruction property (PR) of the LD-MDCT window with a very high precision. Therefore, the algorithm allows the generation of window coefficients in the direct form, as described in ISO/IEC 14496-3:2009, as well as in the lifting form, as described in [2], in a compatible way. This means both implementations generate 16 bit-conform output.

The interpolation of Low Delay MDCT window is performed as follows.

In general a spline interpolation is to be used for generating the downscaled window coefficients to maintain the frequency response and mostly the perfect reconstruction property (around 170 dB SNR). The interpolation needs to be constraint in certain segments to maintain the perfect reconstruction property. For the window coefficients c covering the DCT kernel of the transformation (see also FIG. 1, c(1024) . . . c(2048)), the following constraint is implemented, $$1=|(\mathrm{sgn}\cdot c(i)\cdot c(2N-1-i)+c(N+i)\cdot c(N-1-i))| \text{ for } i=0 \ldots N/2-1 \quad (1)$$

where N denotes the frame size. Some implementation may use different signs to optimize the complexity, here, denoted by sgn. The requirement in (1) can be illustrated by FIG. 1. It should be recalled that simply in even in case of F=2, i.e. halfening the sample rate, leaving-out every second window coefficient of the reference synthesis window to obtain the downscaled synthesis window does not fulfil the requirement.

Figure 1:
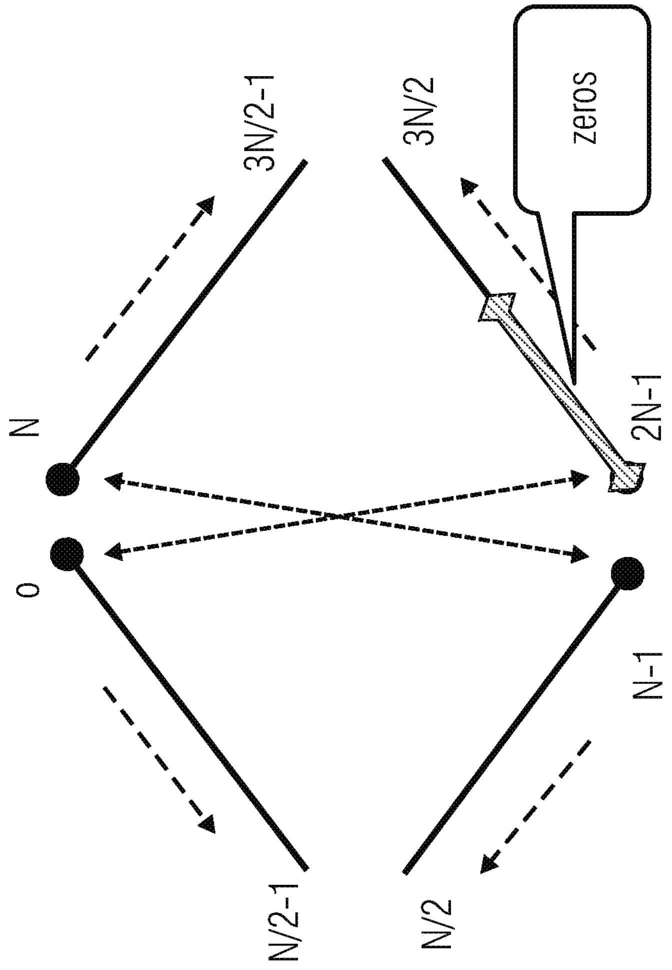
FIG. 1 shows a schematic diagram illustrating perfect reconstruction requirements needed to be obeyed when downscaling decoding in order to preserve perfect reconstruction.

The coefficients c(0) . . . c(2N−1) are listed along the diamond shape. The N/4 zeros in the window coefficients, which are responsible for the delay reduction of the filter bank, are marked using a bold arrow. FIG. 1 shows the dependencies of the coefficients caused by the folding involved in the MDCT and also the points where the interpolation needs to be constraint in order to avoid any undesired dependencies.

Every N/2 coefficient, the interpolation needs to stop to maintain (1)

Additionally, the interpolation algorithm needs to stop every N/4 coefficients due to the inserted zeros. This ensures that the zeros are maintained and the interpolation error is not spread which maintains the PR.

The second constraint is not only implemented for the segment containing the zeros but also for the other segments. Knowing that some coefficients in the DCT kernel were not determined by the optimization algorithm but were determined by formula (1) to enable PR, several discontinuities in the window shape can be explained, e.g. around c(1536+128) in FIG. 1. In order to minimize the PR error, the interpolation needs to stop at such points, which appear in a N/4 grid.

Due to that reason, the segment size of N/4 is chosen for the segmental spline interpolation to generate the downscaled window coefficients. The source window coefficients are given by the coefficients used for N=512, also for downscaling operations resulting in frame sizes of N=240 or N=120. The basic algorithm is outlined very briefly in the following as MATLAB code:

```
FAC = Downscaling factor          % e.g. 0.5
sb   = 128;                       % segment size of source window
w_down = [ ];                     % downscaled window
nSegments = length(W)/(sb);       % number of segments; W=LD
                                    window coefficients for N=512
```

-continued

```
xn=((0:(FAC*sb−1))+0.5)/FAC−0.5;            % spline init
for i=1:nSegments,
   w_down=[w_down,spline([0:(sb−1)],W((i−1)*sb+(1:(sb))),xn)];
end;
```

As the spline function may not be fully deterministic, the complete algorithm is exactly specified in the following section, which may be included into ISO/IEC 14496-3:2009, in order to form an improved downscaled mode in AAC-ELD.

In other words, the following section provides a proposal as to how the above-outlined idea could be applied to ER AAC ELD, i.e. as to how a low-complex decoder could decode a ER AAC ELD bitstream coded at a first data rate at a second data rate lower than the first data rate. It is emphasized however, that the definition of N as used in the following adheres to the standard. Here, N corresponds to the length of the DCT kernel whereas hereinabove, in the claims, and the subsequently described generalized embodiments, N corresponds to the frame length, namely the mutual overlap length of the DCT kernels, i.e. the half of the DCT kernel length. Accordingly, while N was indicated to be 512 hereinabove, for example, it is indicated to be 1024 in the following.

The following paragraphs are proposed for inclusion to 14496-3:2009 via Amendment.

A.0 Adaptation to Systems Using Lower Sampling Rates

For certain applications, ER AAC LD can change the playout sample rate in order to avoid additional resampling steps (see 4.6.17.2.7). ER AAC ELD can apply similar downscaling steps using the Low Delay MDCT window and the LD-SBR tool. In case AAC-ELD operates with the LD-SBR tool, the downscaling factor is limited to multiples of 2. Without LD-SBR, the downscaled frame size needs to be an integer number.

A.1 Downscaling of Low Delay MDCT Window

The LD-MDCT window $w_{LD}$ for N=1024 is downscaled by a factor Fusing a segmental spline interpolation. The number of leading zeros in the window coefficients, i.e. N/8, determines the segment size. The downscaled window coefficients $w_{LD\_d}$ are used for the inverse MDCT as described in 4.6.20.2 but with a downscaled window length $N_d$=N/F. Please note that the algorithm is also able to generate downscaled lifting coefficients of the LD-MDCT.

```
fs_window_size = 2048; /* Number of fullscale window coefficients. According to ISO/IEC 14496-3:2009,
        use 2048. For lifting implemenations, please adjust this variable accordingly */
ds_window_size = N * fs_window_size / (1024 * F); /* downscaled window coefficients; N determines the
        transformation length according to 4.6.20.2 */
fs_segment_size = 128;
num_segments  = fs_window_size / fs_segment_size;
ds_segment_size = ds_window_size / num_segments;
tmp[128], y[128]; /* temporary buffers */
/* loop over segments */
for (b = 0; b < num_segments; b++) {
  /* copy current segment to tmp */
  copy(&W_LD[b * fs_segment_size], tmp, fs_segment_size);
  /* apply cubic spline interpolation for downscaling */
  /* calculate interpolating phase */
  phase = (fs_window_size − ds_window_size) / (2 * ds_window_size);
  /* calculate the coefficients c of the cubic spline given tmp */
  /* array of precalculated constants */
  m = {0.166666672, 0.25, 0.266666681, 0.267857134,
    0.267942578, 0.267948717, 0.267949164};
  n = fs_segment_size; /* for simplicity */
  /* calculate vector r needed to calculate the coefficients c */
  for (i = n − 3; i >= 0; i−−)
    r[i] = 3 * ((tmp[i + 2] − tmp[i + 1]) − (tmp[i + 1] − tmp[i]));
  for (i = 1; i < 7; i++)
    r[i] −= m[i − 1] * r[i − 1];
  for(i = 7; i < n − 4; i++)
    r[i] −= 0.267949194 * r[i − 1];
  /* calculate coefficients c */
  c[n − 2] = r[n − 3] / 6;
  c[n − 3] = (r[n − 4] − c[n − 2]) * 0.25;
  for (i = n − 4; i > 7; i−−)
    c[i] = (r[i − 1] − c[i + 1]) * 0.267949194;
  for (i = 7; i > 1; i−−)
    c[i]=(r[i−1]−c[i+1])*m[i−1];
  c[1] = r[0] * m[0];
  c[0] = 2 * c[1] − c[2];
  c[n−1] = 2 * c[n − 2] − c[n − 3];
  /* keep original samples in temp buffer y because samples of
    tmp will be replaced with interpolated samples */
  copy(tmp, y, fs_segment_size);
  /* generate downscaled points and do interpolation */
  for (k = 0; k < ds_segment_size; k++) {
    step = phase + k * fs_segment_size / ds_segment_size;
    idx = floor(step);
    diff = step − idx;
    di = (c[idx + 1] − c[idx]) / 3;
    bi = (y[idx + 1] − y[idx]) − (c[idx + 1] + 2 * c[idx]) / 3;
    /* calculate downscaled values and store in tmp */
    tmp[k] = y[idx] + diff * (bi + diff * (c[idx] + diff * di));
  }
```

-continued

```
  /* assemble downscaled window */
  copy(tmp, &W_LD_d[b * ds_segment_size], ds_segment_size);
}
```

A.2 Downscaling of Low Delay SBR Tool

In case the Low Delay SBR tool is used in conjunction with ELD, this tool can be downscaled to lower sample rates, at least for downscaling factors of a multiple of 2. The downscale factor F controls the number of bands used for the CLDFB analysis and synthesis filter bank. The following two paragraphs describe a downscaled CLDFB analysis and synthesis filter bank, see also 4.6.19.4.

4.6.20.5.2.1 Downscaled Analyses CLDFB Filter Bank

Define number of downscaled CLDFB bands B=32/F.

Shift the samples in the array x by B positions. The oldest B samples are discarded and B new samples are stored in positions 0 to B−1.

Multiply the samples of array x by the coefficient of window ci to get array z. The window coefficients ci are obtained by linear interpolation of the coefficients c, i.e. through the equation $$ci(i)=\frac{1}{2}[c(2F\cdot i+1+p)+c(2F\cdot i+p)],\ 0\le i<(10B),\ p=\operatorname{int}\left(\frac{64}{2B}-0.5\right).$$

The window coefficients of c can be found in Table 4.A.90.

Sum the samples to create the 2B-element array u:

$$u(n)=z(n)+z(n+2B)+z(n+4B)+z(n+6B)+z(n+8B),0\le n<(2B).$$

Calculate B new subband samples by the matrix operation Mu, where $$M(k,n)=2\cdot\exp\left(\frac{j\cdot\pi(k+0.5)\cdot(2n-(3B-1))}{2B}\right),\ \begin{cases}0\le k<B\\0\le n<2B\end{cases}.$$

In the equation, exp( ) denotes the complex exponential function and j is the imaginary unit.

4.6.20.5.2.2 Downscaled Synthesis CLDFB Filter Bank

Define number of downscaled CLDFB bands B=64/F.

Shift the samples in the array v by 2B positions. The oldest 2B samples are discarded.

The B new complex-valued subband samples are multiplied by the matrix N, where $$N(k,n)=\frac{1}{64}\cdot\exp\left(\frac{j\cdot\pi(k+0.5)\cdot(2n-(3B-1))}{2B}\right),\ \begin{cases}0\le k<B\\0\le n<2B\end{cases}.$$

In the equation, exp( ) denotes the complex exponential function and j is the imaginary unit. The real part of the output from this operation is stored in the positions 0 to 2B−1 of array v.

Extract samples from v to create the 10B-element array g.

$$\begin{matrix}g(2B\cdot n+k)=v(4B\cdot n+k)\\g(2B\cdot n+B+k)=v(4B\cdot n+3B+k)\end{matrix},\ \begin{cases}0\le n\le 4\\0\le k<B\end{cases}$$

Multiply the samples of array g by the coefficient of window ci to produce array w. The window coefficients ci are obtained by linear interpolation of the coefficients c, i.e. through the equation $$ci(i)=\frac{1}{2}[c(2F\cdot i+1+p)+c(2F\cdot i+p)],\ 0\le i<(10B),\ p=\operatorname{int}\left(\frac{64}{2B}-0.5\right).$$

The window coefficients of c can be found in Table 4.A.90.

Calculate B new output samples by summation of samples from array w according to $$\text{output}(n)=\Sigma_{i=0}^{i\le 9}w(Bi+n),0\le n<B.$$

Please note that setting F=2 provides the downsampled synthesis filter bank according to 4.6.19.4.3. Therefore, to process a downsampled LD-SBR bit stream with an additional downscale factor F, F needs to be multiplied by 2.

4.6.20.5.2.3 Downscaled Real-Valued CLDFB Filter Bank

The downscaling of the CLDFB can be applied for the real valued versions of the low power SBR mode as well. For illustration, please also consider 4.6.19.5.

For the downscaled real-valued analysis and synthesis filter bank, follow the description in 4.6.20.5.2.1 and 4.6.20.2.2 and exchange the expo modulator in M by a cos( ) modulator.

A.3 Low Delay MDCT Analysis

This subclause describes the Low Delay MDCT filter bank utilized in the AAC ELD encoder. The core MDCT algorithm is mostly unchanged, but with a longer window, such that n is now running from —N to N−1 (rather than from 0 to N−1)

The spectral coefficient, $x_{i,k}$, are defined as follows:

$$X_{i,k}=-2\cdot\sum_{n=-N}^{N-1}z_{i,n}\cos\left(\frac{2\pi}{N}(n+n_0)\left(k+\frac{1}{2}\right)\right)\text{ for }0\le k<N/2$$

where:

$z_{in}$=windowed input sequence

N=sample index

K=spectral coefficient index

I=block index

N=window length $n_0$=(−N/2+1)/2

The window length N (based on the sine window) is 1024 or 960.

The window length of the low-delay window is 2*N. The windowing is extended to the past in the following way:

$$z_{i,n}=w_{LD}(N-1-n)\cdot x'_{i,n}$$

for n=−N, . . . , N−1, with the synthesis window w used as the analysis window by inverting the order.

A.4 Low Delay MDCT Synthesis

The synthesis filter bank is modified compared to the standard IMDCT algorithm using a sine window in order to adopt a low-delay filter bank. The core IMDCT algorithm is mostly unchanged, but with a longer window, such that n is now running up to 2N−1 (rather than up to N−1).

$$x_{i,n} = -\frac{2}{N} \cdot \sum_{k=0}^{\frac{N}{2}-1} spec[i][k]\cos\left(\frac{2\pi}{N}(n+n_0)\left(k+\frac{1}{2}\right)\right) \text{ for } 0 \le n < 2N$$

where:

n=sample index i=window index k=spectral coefficient index

N=window length/twice the frame length $n_0=(-N/2+1)/2$ with N=960 or 1024.

The windowing and overlap-add is conducted in the following way:

The length N window is replaced by a length 2N window with more overlap in the past, and less overlap to the future (N/8 values are actually zero).

Windowing for the Low Delay Window:

$$z_{i,n}=w_{LD}(n)\cdot x_{i,n}$$

Where the window now has a length of 2N, hence n=0, . . . , 2N−1.

Overlap and add:

$$\text{out}_{i,n} = z_{i,n} + z_{i-1,n+\frac{N}{2}} + z_{i-2,n+N} + z_{i-3,n+N+\frac{N}{2}}$$

for 0<=n<N/2

Here, the paragraphs proposed for being included into 14496-3:2009 via amendment end.

Naturally, the above description of a possible downscaled mode for AAC-ELD merely represents one embodiment of the present application and several modifications are feasible.

Generally, embodiments of the present application are not restricted to an audio decoder performing a downscaled version of AAC-ELD decoding. In other words, embodiments of the present application may, for instance, be derived by forming an audio decoder capable of performing the inverse transformation process in a downscaled manner only without supporting or using the various AAC-ELD specific further tasks such as, for instance, the scale factor-based transmission of the spectral envelope, TNS (temporal noise shaping) filtering, spectral band replication (SBR) or the like.

Subsequently, a more general embodiment for an audio decoder is described. The above-outlined example for an AAC-ELD audio decoder supporting the described downscaled mode could thus represent an implementation of the subsequently described audio decoder. In particular, the subsequently explained decoder is shown in FIG. 2 while FIG. 3 illustrates the steps performed by the decoder of FIG. 2.

Figure 2:
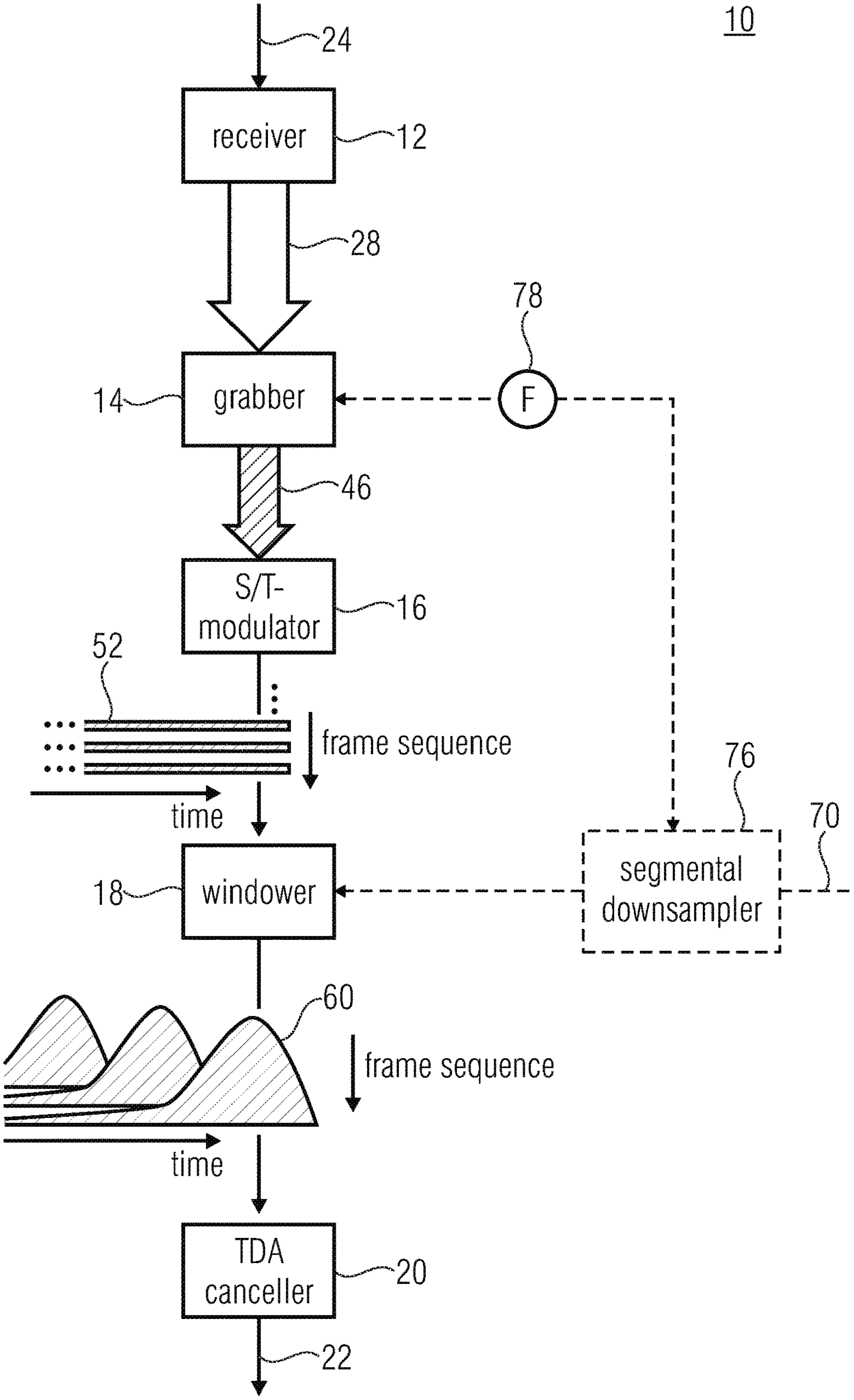
FIG. 2 shows a block diagram of an audio decoder for downscaled decoding according to an embodiment.

The audio decoder of FIG. 2, which is generally indicated using reference sign 10, comprises a receiver 12, a grabber 14, a spectral-to-time modulator 16, a windower 18 and a time domain aliasing canceler 20, all of which are connected in series to each other in the order of their mentioning. The interaction and functionality of blocks 12 to 20 of audio decoder 10 are described in the following with respect to FIG. 3. As described at the end of the description of the present application, blocks 12 to 20 may be implemented in software, programmable hardware or hardware such as in the form of a computer program, an FPGA or appropriately programmed computer, programmed microprocessor or application specific integrated circuit with the blocks 12 to 20 representing respective subroutines, circuit paths or the like.

In a manner outlined in more details below, the audio decoder 10 of FIG. 2 is configured to,—and the elements of the audio decoder 10 are configured to appropriately cooperate—in order to decode an audio signal 22 from a data stream 24 with a noteworthiness that audio decoder decodes signal 22 at a sampling rate being $1/F^{th}$ of the sampling rate at which the audio signal 22 has been transform coded into data stream 24 at the encoding side. F may, for instance, be any rational number greater than one. The audio decoder may be configured to operate at different or varying downscaling factors F or at a fixed one. Alternatives are described in more detail below.

Figure 3:
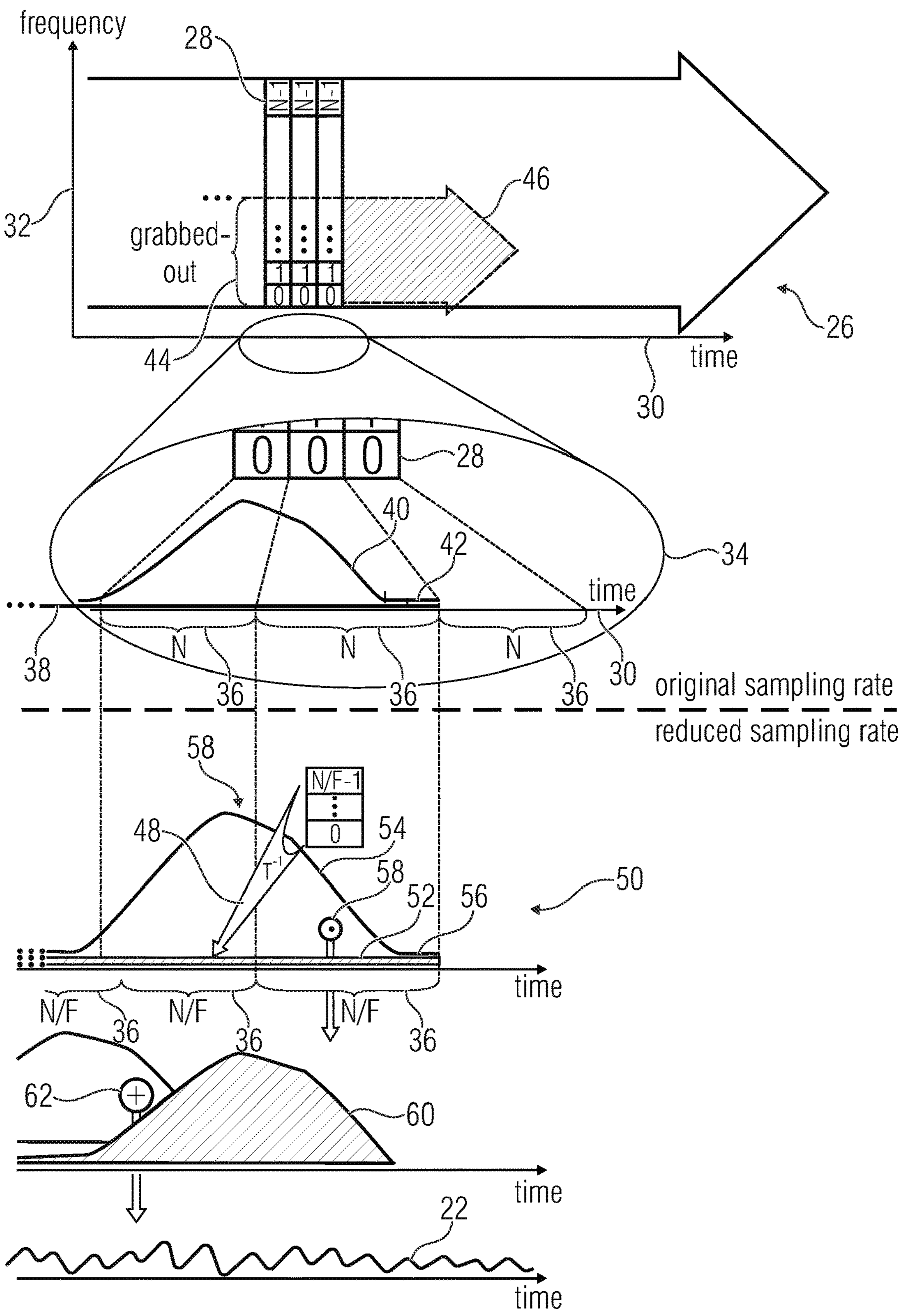
FIG. 3 shows a schematic diagram illustrating in the upper half the manner in which an audio signal has been coded at an original sampling rate into a data stream and, in the lower half separated from the upper half by a dashed horizontal line, a downscaled decoding operation for reconstructing the audio signal from the data stream at a reduced or downscaled sampling rate, so as to illustrate the mode of operation of the audio decoder of FIG. 2.

The manner in which the audio signal 22 is transform coded at the encoding or original sampling rate into the data stream is illustrated in FIG. 3 in the upper half. At 26 FIG. 3 illustrates the spectral coefficients using small boxes or squares 28 arranged in a spectrotemporal manner along a time axis 30 which runs horizontally in FIG. 3, and a frequency axis 32 which runs vertically in FIG. 3, respectively. The spectral coefficients 28 are transmitted within data stream 24. The manner in which the spectral coefficients 28 have been obtained, and thus the manner via which the spectral coefficients 28 represent the audio signal 22, is illustrated in FIG. 3 at 34, which illustrates for a portion of time axis 30 how the spectral coefficients 28 belonging to, or representing the respective time portion, have been obtained from the audio signal.

In particular, coefficients 28 as transmitted within data stream 24 are coefficients of a lapped transform of the audio signal 22 so that the audio signal 22, sampled at the original or encoding sampling rate, is partitioned into immediately temporally consecutive and non-overlapping frames of a predetermined length N, wherein N spectral coefficients are transmitted in data stream 24 for each frame 36. That is, transform coefficients 28 are obtained from the audio signal 22 using a critically sampled lapped transform. In the spectrotemporal spectrogram representation 26, each column of the temporal sequence of columns of spectral coefficients 28 corresponds to a respective one of frames 36 of the sequence of frames. The N spectral coefficients 28 are obtained for the corresponding frame 36 by a spectrally decomposing transform or time-to-spectral modulation, the modulation functions of which temporally extend, however, not only across the frame 36 to which the resulting spectral coefficients 28 belong, but also across E+1 previous frames, wherein E may be any integer or any even numbered integer greater than zero. That is, the spectral coefficients 28 of one column of the spectrogram at 26 which belonged to a certain frame 36 are obtained by applying a transform onto a transform window, which in addition the respective frame comprises E+1 frames lying in the past relative to the current frame. The spectral decomposition of the samples of the audio signal within this transform window 38, which is illustrated in FIG. 3 for the column of transform coefficients 28 belonging to the middle frame 36 of the portion shown at 34 is achieved using a low delay unimodal analysis window function 40 using which the spectral samples within the transform window 38 are weighted prior to subjecting same to an MDCT or MDST or other spectral decomposition transform. In order to lower the encoder-side delay, the analysis window 40 comprises a zero-interval 42 at the temporal leading end thereof so that the encoder does not need to await the corresponding portion of newest samples within the current frame 36 so as to compute the spectral coefficients 28 for this current frame 36. That is, within the zero-interval 42 the low delay window function 40 is zero or has zero window coefficients so that the co-located audio samples of the current frame 36 do not, owing to the window weighting 40, contribute to the transform coefficients 28 transmitted for that frame and a data stream 24. That is, summarizing the above, transform coefficients 28 belonging to a current frame 36 are obtained by windowing and spectral decomposition of samples of the audio signal within a transform window 38 which comprises the current frame as well as temporally preceding frames and which temporally overlaps with the corresponding transform windows used for determining the spectral coefficients 28 belonging to temporally neighboring frames.

Before resuming the description of the audio decoder 10, it should be noted that the description of the transmission of the spectral coefficients 28 within the data stream 24 as provided so far has been simplified with respect to the manner in which the spectral coefficients 28 are quantized or coded into data stream 24 and/or the manner in which the audio signal 22 has been pre-processed before subjecting the audio signal to the lapped transform. For example, the audio encoder having transform coded audio signal 22 into data stream 24 may be controlled via a psychoacoustic model or may use a psychoacoustic model to keep the quantization noise and quantizing the spectral coefficients 28 unperceivable for the hearer and/or below a masking threshold function, thereby determining scale factors for spectral bands using which the quantized and transmitted spectral coefficients 28 are scaled. The scale factors would also be signaled in data stream 24. Alternatively, the audio encoder may have been a TCX (transform coded excitation) type of encoder. Then, the audio signal would have had subject to a linear prediction analysis filtering before forming the spectrotemporal representation 26 of spectral coefficients 28 by applying the lapped transform onto the excitation signal, i.e. the linear prediction residual signal. For example, the linear prediction coefficients could be signaled in data stream 24 as well, and a spectral uniform quantization could be applied in order to obtain the spectral coefficients 28.

Furthermore, the description brought forward so far has also been simplified with respect to the frame length of frames 36 and/or with respect to the low delay window function 40. In fact, the audio signal 22 may have been coded into data stream 24 in a manner using varying frame sizes and/or different windows 40. However, the description brought forward in the following concentrates on one window 40 and one frame length, although the subsequent description may easily be extended to a case where the entropy encoder changes these parameters during coding the audio signal into the data stream.

Returning back to the audio decoder 10 of FIG. 2 and its description, receiver 12 receives data stream 24 and receives thereby, for each frame 36, N spectral coefficients 28, i.e. a respective column of coefficients 28 shown in FIG. 3. It should be recalled that the temporal length of the frames 36, measured in samples of the original or encoding sampling rate, is N as indicated in FIG. 3 at 34, but the audio decoder 10 of FIG. 2 is configured to decode the audio signal 22 at a reduced sampling rate. The audio decoder 10 supports, for example, merely this downscaled decoding functionality described in the following. Alternatively, audio decoder 10 would be able to reconstruct the audio signal at the original or encoding sampling rate, but may be switched between the downscaled decoding mode and a non-downscaled decoding mode with the downscaled decoding mode coinciding with the audio decoder's 10 mode of operation as subsequently explained. For example, audio encoder 10 could be switched to a downscaled decoding mode in the case of a low battery level, reduced reproduction environment capabilities or the like. Whenever the situation changes the audio decoder 10 could, for instance, switch back from the downscaled decoding mode to the non-downscaled one. In any case, in accordance with the downscaled decoding process of decoder 10 as described in the following, the audio signal 22 is reconstructed at a sampling rate at which frames 36 have, at the reduced sampling rate, a lower length measured in samples of this reduced sampling rate, namely a length of N/F samples at the reduced sampling rate.

The output of receiver 12 is the sequence of N spectral coefficients, namely one set of N spectral coefficients, i.e. one column in FIG. 3, per frame 36. It already turned out from the above brief description of the transform coding process for forming data stream 24 that receiver 12 may apply various tasks in obtaining the N spectral coefficients per frame 36. For example, receiver 12 may use entropy decoding in order to read the spectral coefficients 28 from the data stream 24. Receiver 12 may also spectrally shape the spectral coefficients read from the data stream with scale factors provided in the data stream and/or scale factors derived by linear prediction coefficients conveyed within data stream 24. For example, receiver 12 may obtain scale factors from the data stream 24, namely on a per frame and per subband basis, and use these scale factors in order to scale the scale factors conveyed within the data stream 24. Alternatively, receiver 12 may derive scale factors from linear prediction coefficients conveyed within the data stream 24, for each frame 36, and use these scale factors in order to scale the transmitted spectral coefficients 28. Optionally, receiver 12 may perform gap filling in order to synthetically fill zero-quantized portions within the sets of N spectral coefficients 18 per frame. Additionally or alternatively, receiver 12 may apply a TNS-synthesis filter onto a transmitted TNS filter coefficient per frame to assist the reconstruction of the spectral coefficients 28 from the data stream with the TNS coefficients also being transmitted within the data stream 24. The just outlined possible tasks of receiver 12 shall be understood as a non-exclusive list of possible measures and receiver 12 may perform further or other tasks in connection with the reading of the spectral coefficients 28 from data stream 24.

Grabber 14 thus receives from receiver 12 the spectrogram 26 of spectral coefficients 28 and grabs, for each frame 36, a low frequency fraction 44 of the N spectral coefficients of the respective frame 36, namely the N/F lowest-frequency spectral coefficients.

That is, spectral-to-time modulator 16 receives from grabber 14 a stream or sequence 46 of N/F spectral coefficients 28 per frame 36, corresponding to a low-frequency slice out of the spectrogram 26, spectrally registered to the lowest frequency spectral coefficients illustrated using index "0" in FIG. 3, and extending till the spectral coefficients of index N/F−1.

The spectral-to-time modulator 16 subjects, for each frame 36, the corresponding low-frequency fraction 44 of spectral coefficients 28 to an inverse transform 48 having modulation functions of length (E+2)·N/F temporally extending over the respective frame and E+1 previous frames as illustrated at 50 in FIG. 3, thereby obtaining a temporal portion of length (E+2)·N/F, i.e. a not-yet windowed time segment 52. That is, the spectral-to-time modulator may obtain a temporal time segment of (E+2)·N/F samples of reduced sampling rate by weighting and summing modulation functions of the same length using, for instance, the first formulae of the proposed replacement section A.4 indicated above. The newest N/F samples of time segment 52 belong to the current frame 36. The modulation functions may, as indicated, be cosine functions in case of the inverse transform being an inverse MDCT, or sine functions in case of the inverse transform being an inverse MDCT, for instance.

Thus, windower 52 receives, for each frame, a temporal portion 52, the N/F samples at the leading end thereof temporally corresponding to the respective frame while the other samples of the respective temporal portion 52 belong to the corresponding temporally preceding frames. Windower 18 windows, for each frame 36, the temporal portion 52 using a unimodal synthesis window 54 of length (E+2)·N/F comprising a zero-portion 56 of length ¼ ·N/F at a leading end thereof, i.e. 1/F·N/F zero-valued window coefficients, and having a peak 58 within its temporal interval succeeding, temporally, the zero-portion 56, i.e. the temporal interval of temporal portion 52 not covered by the zero-portion 52. The latter temporal interval may be called the non-zero portion of window 58 and has a length of 7/4·N/F measured in samples of the reduced sampling rate, i.e. 7/4·N/F window coefficients. The windower 18 weights, for instance, the temporal portion 52 using window 58. This weighting or multiplying 58 of each temporal portion 52 with window 54 results in a windowed temporal portion 60, one for each frame 36, and coinciding with the respective temporal portion 52 as far as the temporal coverage is concerned. In the above proposed section A.4, the windowing processing which may be used by window 18 is described by the formulae relating $z_{i,n}$ to $x_{i,n}$, where $x_{i,n}$ corresponds to the aforementioned temporal portions 52 not yet windowed and $z_{i,n}$ corresponds to the windowed temporal portions 60 with i indexing the sequence of frames/windows, and n indexing, within each temporal portion 52/60, the samples or values of the respective portions 52/60 in accordance with a reduced sampling rate.

Thus, the time domain aliasing canceler 20 receives from windower 18 a sequence of windowed temporal portions 60, namely one per frame 36. Canceler 20 subjects the windowed temporal portions 60 of frames 36 to an overlap-add process 62 by registering each windowed temporal portion 60 with its leading N/F values to coincide with the corresponding frame 36. By this measure, a trailing-end fraction of length (E+1)/(E+2) of the windowed temporal portion 60 of a current frame, i.e. the remainder having length (E+1)·N/F, overlaps with a corresponding equally long leading end of the temporal portion of the immediately preceding frame. In formulae, the time domain aliasing canceler 20 may operate as shown in the last formula of the above proposed version of section A.4, where $out_{i,n}$ corresponds to the audio samples of the reconstructed audio signal 22 at the reduced sampling rate.

Figure 4:
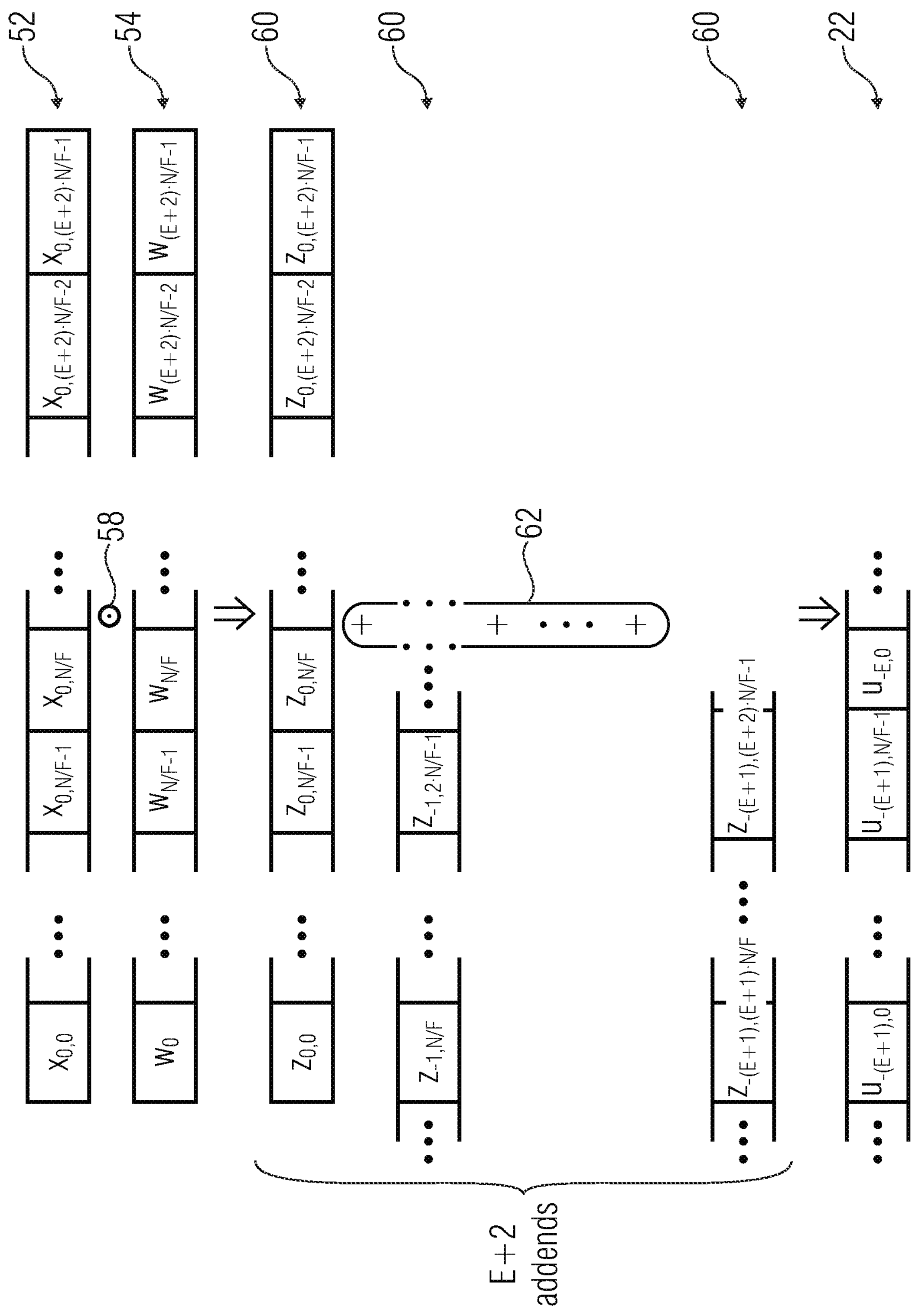
FIG. 4 shows a schematic diagram illustrating the cooperation of the windower and time domain aliasing canceler of FIG. 2.

The processes of windowing 58 and overlap-adding 62 as performed by windower 18 and time domain aliasing canceler 20 are illustrated in more detail below with respect to FIG. 4. FIG. 4 uses both the nomenclature applied in the above-proposed section A.4 and the reference signs applied in FIGS. 3 and 4. $x_{0,0}$ to $x_{0,(E+2)\cdot N/F-1}$ represents the $0^{th}$ temporal portion 52 obtained by the spatial-to-temporal-modulator 16 for the $0^{th}$ frame 36. The first index of x indexes the frames 36 along the temporal order, and the second index of x orders the samples of the temporal along the temporal order, the inter-sample pitch belonging to the reduced sample rate. Then, in FIG. 4, $w_0$ to $w_{(E+2)\cdot N/F-1}$ indicate the window coefficients of window 54. Like the second index of x, i.e. the temporal portion 52 as output by modulator 16, the index of w is such that index 0 corresponds to the oldest and index (E+2)·N/F−1 corresponds to the newest sample value when the window 54 is applied to the respective temporal portion 52. Windower 18 windows the temporal portion 52 using window 54 to obtain the windowed temporal portion 60 so that $z_{0,0}$ to $z_{0,(E+2)\cdot N/F-1}$, which denotes the windowed temporal portion 60 for the $0^{th}$ frame, is obtained according to $z_{0,0}=x_{0,0}\cdot w_0$, $z_{0,(E+2)\cdot N/F-1}=x_{0,(E+2)\cdot N/F-1}\cdot w_{(E+2)\cdot N/F-1}$ The indices of z have the same meaning as for x. In this manner, modulator 16 and windower 18 act for each frame indexed by the first index of x and z. Canceler 20 sums up E+2 windowed temporal portions 60 of E+2 immediately consecutive frames with offsetting the samples of the windowed temporal portions 60 relative to each other by one frame, i.e. by the number of samples per frame 36, namely N/F, so as to obtain the samples u of one current frame, here $u_{-(E+1),0} \ldots u_{-(E+1),N/F-1)}$. Here, again, the first index of u indicates the frame number and the second index orders the samples of this frame along the temporal order. The canceller joins the reconstructed frames thus obtained so that the samples of the reconstructed audio signal 22 within the consecutive frames 36 follow each other according to $u_{-(E+1),0} \ldots u_{-(E+1),N/F-1}$, $u_{-E,0}$, $u_{-E,N/F-1}$, $u_{-(E-1),0}$, ... the canceler 22 computes each sample of the audio signal 22 within the $-(E+1)^{th}$ frame according to $u_{-(E+1),0}=z_{0,0}+z_{-1,N/F}+ \ldots z_{-(E+1),(E+1)\cdot N/F}$, ..., $u_{-(E+1)\cdot N/F-1}=z_{0,N/F-1}+z_{-1,2\ N/F-1}+ \ldots +z_{-(E+1),(E+2)N/F-1}$, i.e. summing up (e+2) addends per samples u of the current frame.

Figure 5:
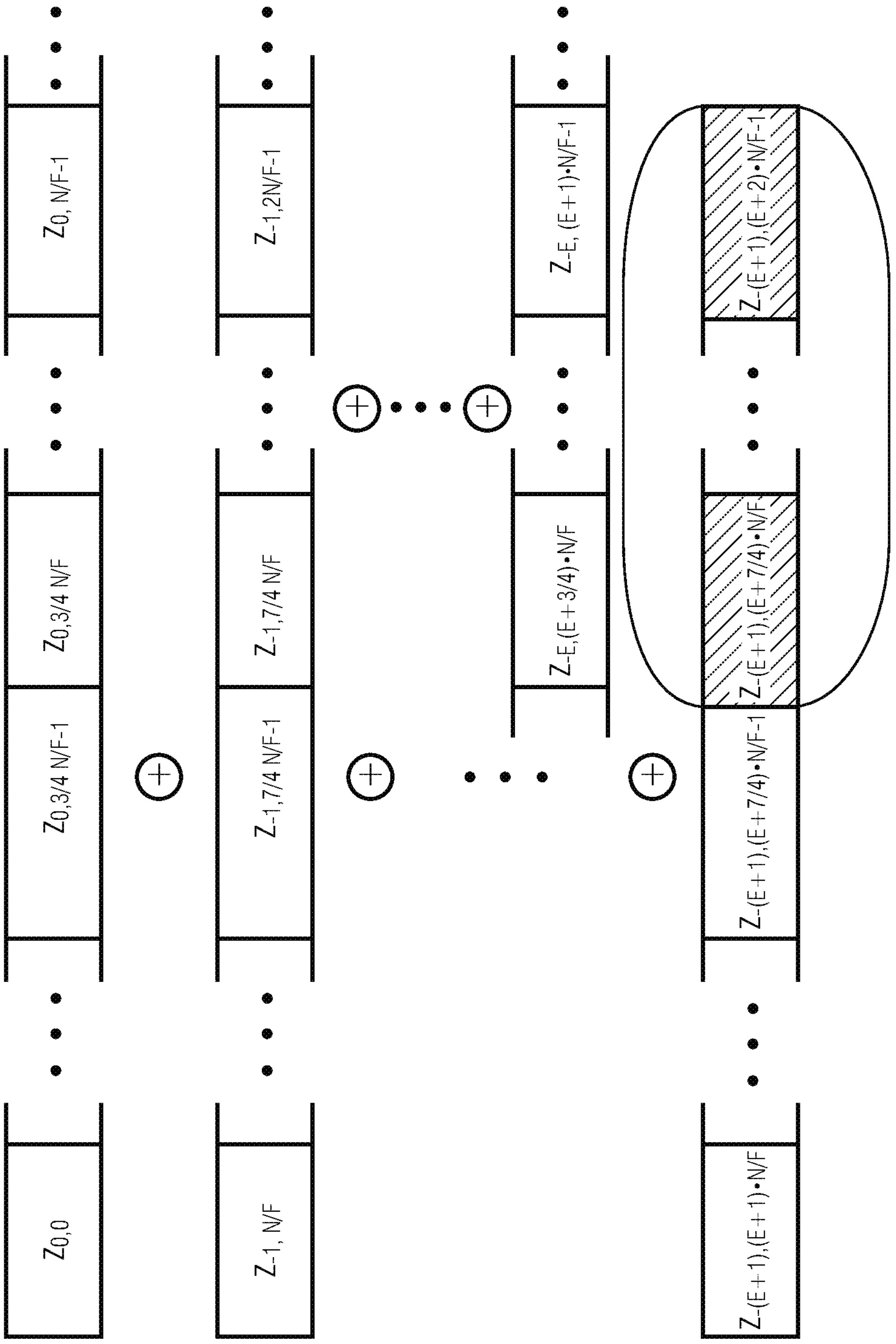
FIG. 5 illustrates a possible implementation for achieving the reconstruction according to FIG. 4 using a special treatment of the zero-weighted portions of the spectral-to-time modulated time portions.

FIG. 5 illustrates a possible exploitation of the fact that, among the just windowed samples contributing to the audio samples u of frame −(E+1), the ones corresponding to, or having been windowed using, the zero-portion 56 of window 54, namely $z_{-(E+1),(E+7/4)\cdot N/F} \ldots z_{-(E+1),(E+2)\cdot N/F-1}$ are zero valued. Thus, instead of obtaining all N/F samples within the $-(E+1)^{th}$ frame 36 of the audio signal u using E+2 addends, canceler 20 may compute the leading end quarter thereof, namely $u_{-(E+1),(E+7/4)\cdot N/F} \ldots u_{-(E+1),(E+2)N/F-1}$ merely using E+1 addends according to $u_{-(E+1),(E+7/4)\cdot N/F}=z_{0,3/4\cdot N/F}+z_{-1,7/4\ N/F}+ \ldots + z_{-E,(E+3/4)\cdot N/F}$, ..., $u_{-(E+1),(E+2)N/F-1}=z_{0,N/F-1}+z_{-1,2\ N/F-1}+ \ldots +z_{-E,(E+1)\cdot N/F-1}$. In this manner, the windower could even leave out, effectively, the performance of the weighting 58 with respect to the zero-portion 56. Samples $u_{-(E+1),(E+7/4)\cdot N/F} \ldots u_{-(E+1),(E+2)N/F-1}$ of current $-(E+1)^{th}$ frame would, thus, be obtained using E+1 addends only, while $u_{-(E+1),(E+1)N/F} \ldots u_{-(E+1),(E+7/4)\cdot N/F-1}$ would be obtained using E+2 addends.

Figure 6:
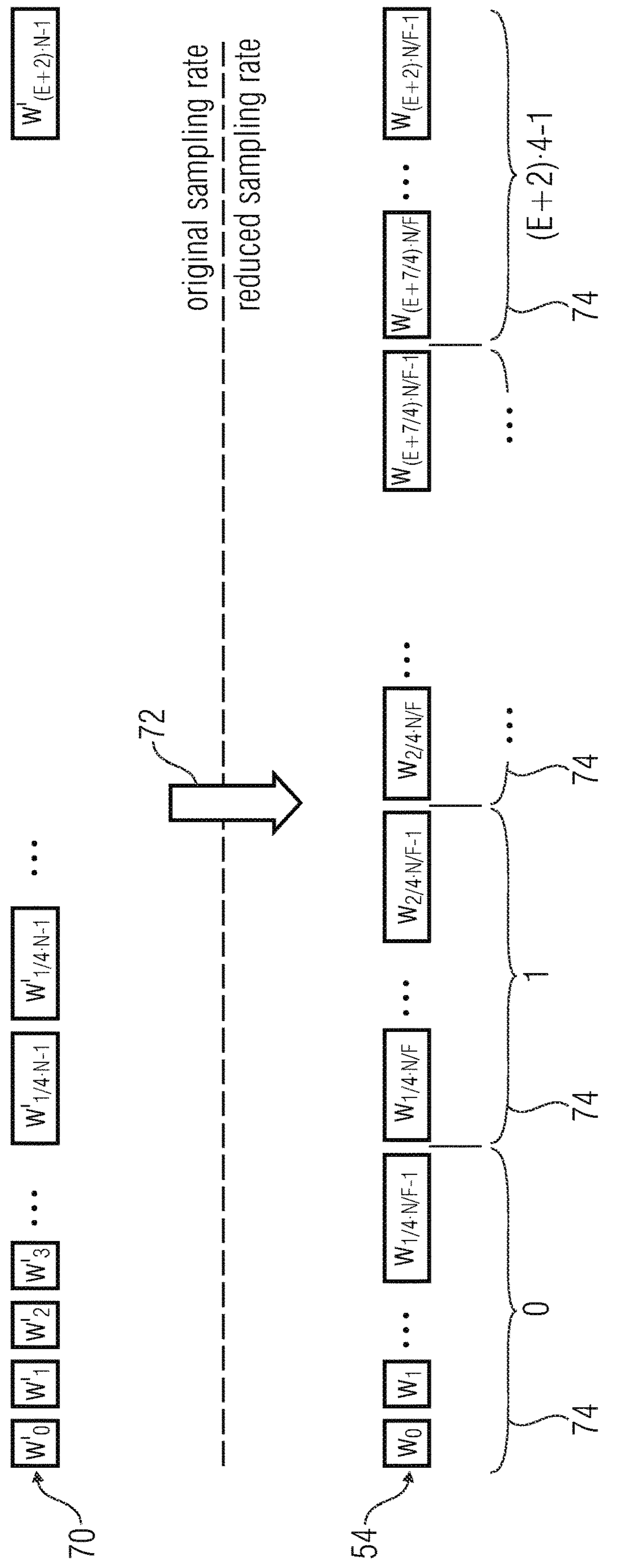
FIG. 6 shows a schematic diagram illustrating the downsampling to obtain the downsampled synthesis window.

Thus, in the manner outlined above, the audio decoder 10 of FIG. 2 reproduces, in a downscaled manner, the audio signal coded into data stream 24. To this end, the audio decoder 10 uses a window function 54 which is itself a downsampled version of a reference synthesis window of length (E+2)·N. As explained with respect to FIG. 6, this downsampled version, i.e. window 54, is obtained by downsampling the reference synthesis window by a factor of F, i.e. the downsampling factor, using a segmental interpolation, namely in segments of length ¼N when measured in the not yet downscaled regime, in segments of length ¼·N/F in the downsampled regime, in segments of quarters of a frame length of frames 36, measured temporally and expressed independently from the sampling rate. In 4·(E+2) the interpolation is, thus, performed, thus yielding 4·(E+2) times ¼·N/F long segments which, concatenated, represent the downsampled version of the reference synthesis window of length (E+2)·N. See FIG. 6 for illustration. FIG. 6 shows the synthesis window 54 which is unimodal and used by the audio decoder 10 in accordance with a downsampled audio decoding procedure underneath the reference synthesis window 70 which his of length (E+2)·N. That is, by the downsampling procedure 72 leading from the reference synthesis window 70 to the synthesis window 54 actually used by the audio decoder 10 for downsampled decoding, the number of window coefficients is reduced by a factor of F. In FIG. 6, the nomenclature of FIGS. 5 and 6 has been adhered to, i.e. w is used in order to denote the downsampled version window 54, while w' has been used to denote the window coefficients of the reference synthesis window 70.

As just mentioned, in order to perform the downsampling 72, the reference synthesis window 70 is processed in segments 74 of equal length. In number, there are (E+2)·4 such segments 74. Measured in the original sampling rate, i.e. in the number of window coefficients of the reference synthesis window 70, each segment 74 is ¼·N window coefficients w' long, and measured in the reduced or downsampled sampling rate, each segment 74 is ¼·N/F window coefficients w long.

Naturally, it would be possible to perform the downsampling 72 for each downsampled window coefficient $w_i$ coinciding accidentally with any of the window coefficients $w_j'$ of the reference synthesis window 70 by simply setting $w_i=w_j'$ with the sample time of $w_i$ coinciding with that of $w_j'$ and/or by linearly interpolating any window coefficients $w_i$ residing, temporally, between two window coefficients $w_j'$ and $w_{j+2}'$ by linear interpolation, but this procedure would result in a poor approximation of the reference synthesis window 70, i.e. the synthesis window 54 used by audio decoder 10 for the downsampled decoding would represent a poor approximation of the reference synthesis window 70, thereby not fulfilling the request for guaranteeing conformance testing of the downscaled decoding relative to the non-downscaled decoding of the audio signal from data stream 24. Thus, the downsampling 72 involves an interpolation procedure according to which the majority of the window coefficients $w_i$ of the downsampled window 54, namely the ones positioned offset from the borders of segments 74, depend by way of the downsampling procedure 72 on more than two window coefficients w' of the reference window 70. In particular, while the majority of the window coefficients $w_i$ of the downsampled window 54 depend on more than two window coefficients $w_j'$ of the reference window 70 in order to increase the quality of the interpolation/downsampling result, i.e. the approximation quality, for every window coefficient $w_i$ of the downsampled version 54 it holds true that same does not depend in window coefficients $w_j'$ belonging to different segments 74. Rather, the downsampling procedure 72 is a segmental interpolation procedure.

For example, the synthesis window 54 may be a concatenation of spline functions of length ¼·N/F. Cubic spline functions may be used. Such an example has been outlined above in section A.1 where the outer for-next loop sequentially looped over segments 74 wherein, in each segment 74, the downsampling or interpolation 72 involved a mathematical combination of consecutive window coefficients w' within the current segment 74 at, for example, the first for next clause in the section "calculate vector r needed to calculate the coefficients c". The interpolation applied in segments, may, however, also be chosen differently. That is, the interpolation is not restricted to splines or cubic splines. Rather, linear interpolation or any other interpolation method may be used as well. In any case, the segmental implementation of the interpolation would cause the computation of samples of the downscaled synthesis window, i.e. the outmost samples of the segments of the downscaled synthesis window, neighboring another segment, to not depend on window coefficients of the reference synthesis window residing in different segments.

It may be that windower 18 obtains the downsampled synthesis window 54 from a storage where the window coefficients $w_i$ of this downsampled synthesis window 54 have been stored after having been obtained using the downsampling 72. Alternatively, as illustrated in FIG. 2, the audio decoder 10 may comprise a segmental downsampler 76 performing the downsampling 72 of FIG. 6 on the basis of the reference synthesis window 70.

It should be noted that the audio decoder 10 of FIG. 2 may be configured to support merely one fixed downsampling factor F or may support different values. In that case, the audio decoder may be responsive to an input value for F as illustrated in FIG. 2 at 78. The grabber 14, for instance, may be responsive to this value F in order to grab, as mentioned above, the N/F spectral values per frame spectrum. In a like manner, the optional segmental downsampler 76 may also be responsive to this value of F an operate as indicated above. The S/T modulator 16 may be responsive to F either in order to, for example, computationally derive downscaled/downsampled versions of the modulation functions, downscaled/downsampled relative to the ones used in not-downscaled operation mode where the reconstruction leads to the full audio sample rate.

Naturally, the modulator 16 would also be responsive to F input 78, as modulator 16 would use appropriately downsampled versions of the modulation functions and the same holds true for the windower 18 and canceler 20 with respect to an adaptation of the actual length of the frames in the reduced or downsampled sampling rate.

For example, F may lie between 1.5 and 10, both inclusively.

It should be noted that the decoder of FIGS. 2 and 3 or any modification thereof outlined herein, may be implemented so as to perform the spectral-to-time transition using a lifting implementation of the Low Delay MDCT as taught in, for example, EP 2 378 516 B1.

Figure 8:
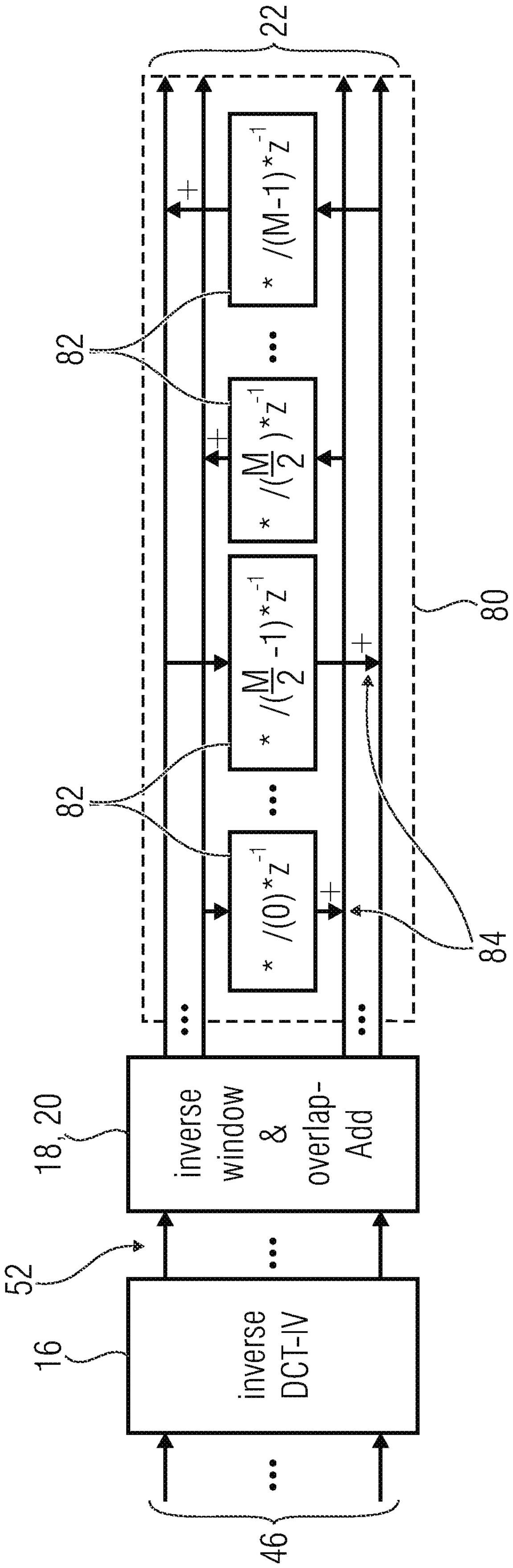
FIG. 8 shows a block diagram of an audio decoder for downscaled decoding according to an embodiment where modulator, windower and canceller are implemented according to a lifting implementation.

FIG. 8 illustrates an implementation of the decoder using the lifting concept. The S/T modulator 16 performs exemplarily an inverse DCT-IV and is shown as followed by a block representing the concatenation of the windower 18 and the time domain aliasing canceller 20. In the example of FIG. 8 E is 2, i.e. E=2.

The modulator 16 comprises an inverse type-iv discrete cosine transform frequency/time converter. Instead of outputting sequences of (E+2)·N/F long temporal portions 52, it merely outputs temporal portions 52 of length 2·N/F, all derived from the sequence of N/F long spectra 46, these shortened portions 52 corresponding to the DCT kernel, i.e. the 2·N/F newest samples of the erstwhile described portions.

The windower 18 acts as described previously and generates a windowed temporal portion 60 for each temporal portion 52, but it operates merely on the DCT kernel. To this end, windower 18 uses window function $\omega_i$ with i=0 . . . 2·N/F−1, having the kernel size. The relationship between $w_i$ with i=0 . . . (E+2)·N/F−1 is described later, just as the relationship between the subsequently mentioned lifting coefficients and $w_i$ with i=0 . . . (E+2)·N/F−1 is.

Using the nomenclature applied above, the process described so far yields:

$$z_{k,n}=\omega_n \cdot x_{k,n} \text{ for } n=0, \ldots ,2M-1,$$

with redefining M=N/F, so that M corresponds to the frame size expressed in the downscaled domain and using the nomenclature of FIG. 2-6, wherein, however, $z_{k,n}$ and $x_{k,n}$ shall contain merely the samples of the windowed temporal portion and the not-yet windowed temporal portion within the DCT kernel having size 2·M and temporally corresponding to samples E·N/F . . . (E+2)·N/F−1 in FIG. 4. That is, n is an integer indicating a sample index and con is a real-valued window function coefficient corresponding to the sample index n.

The overlap/add process of the canceller 20 operates in a manner different compared to the above description. It generates intermediate temporal portions $m_k(0)$, . . . $m_k(M-1)$ based on the equation or expression $$m_{k,n}=z_{k,n}+z_{k-1,n+M} \text{ for } n=0, \ldots, M-1.$$

In the implementation of FIG. 8, the apparatus further comprises a lifter 80 which may be interpreted as a part of the modulator 16 and windower 18 since the lifter 80 compensates the fact the modulator and the windower restricted their processing to the DCT kernel instead of processing the extension of the modulation functions and the synthesis window beyond the kernel towards the past which extension was introduced to compensate for the zero portion 56. The lifter 80 produces, using a framework of the delayers and multipliers 82 and adders 84, the finally reconstructed temporal portions or frames of length M in pairs of immediately consecutive frames based on the equation or expression and $$u_{k,n}=m_{k,n}+I_{n-M/2}\cdot m_{k-1,M-1-n} \text{ for } n=M/2, \ldots, M-1,$$

$$u_{k,n}=m_{k,n}+I_{M-1-n}\cdot \text{out}_{k,n-1,M-1-n} \text{ for } n=0, \ldots, M/2-1$$

wherein $I_n$ with n=0 . . . M−1 are real-valued lifting coefficients related to the downscaled synthesis window in a manner described in more detail below.

Figure 9:
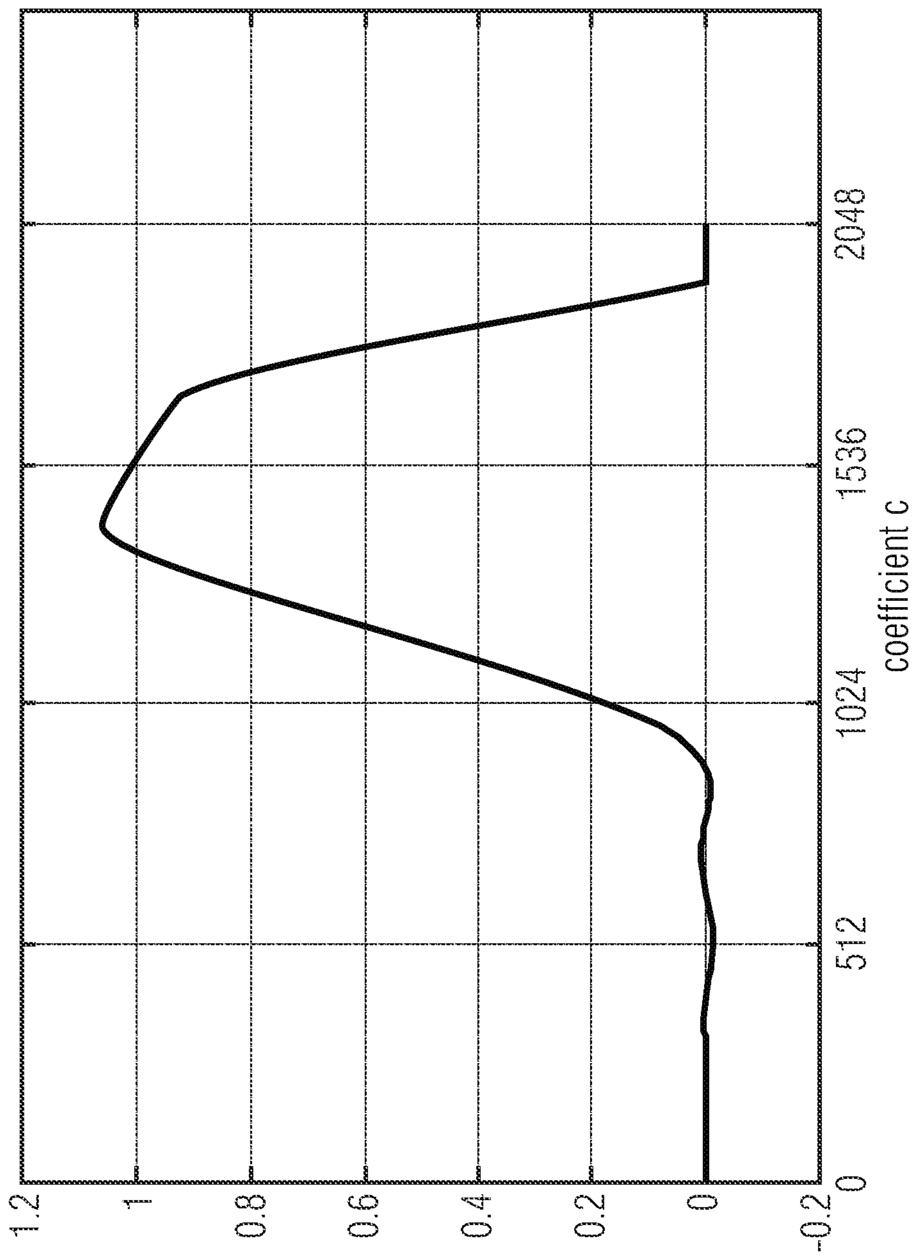
FIG. 9 shows a graph of the window coefficients of a low delay window according to AAC-ELD for 512 sample frame size as an example of a reference synthesis window to be downsampled.

In other words, for the extended overlap of E frames into the past, only M additional multiplier-add operations are implemented, as can be seen in the framework of the lifter 80. These additional operations are sometimes also referred to as "zero-delay matrices". Sometimes these operations are also known as "lifting steps". The efficient implementation shown in FIG. 8 may under some circumstances be more efficient as a straightforward implementation. To be more precise, depending on the concrete implementation, such a more efficient implementation might result in saving M operations, as in the case of a straightforward implementation for M operations, it might be advisable to implement, as the implementation shown in FIG. 9, uses in principle, 2M operations in the framework of the module 820 and M operations in the framework of the lifter 830.

As to the dependency of $\omega_n$ with n=0 . . . 2M−1 and $I_n$ with n=0 . . . M−1 on the synthesis window $w_i$ with i=0 . . . (E+2)M−1 (it is recalled that here E=2), the following formulae describe the relationship between them with displacing, however, the subscript indices used so far into the parenthesis following the respective variable:

$$w(i) = l\left(\frac{M}{2} - 1 - n\right) \cdot l(M - 1 - n) \cdot \omega(M + n)$$

$$w(M/2 + i) = l(n) \cdot l(M/2 + n) \cdot \omega(3M/2 + n)$$

$$w(M + i) = l\left(\frac{M}{2} - 1 - n\right) \cdot \omega(M + n)$$

-continued $$\omega(3M/2 + i) = -l(n) \cdot \omega(3M/2 + n)$$

$$w(2M + i) = -\omega(M + n) + l(M - 1 - n) \cdot \omega(n)$$

$$w(5M/2 + i) = -\omega(3M/2 + n) - l(M/2 + n) \cdot \omega(M/2 + n)$$

$$w(3M + i) = -\omega(n)$$

$$w(7M/2 + i) = \omega(M + n) \text{ for } i, n = 0 \ldots \frac{M}{2} - 1$$

Please note that the window $w_i$ contains the peak values on the right side in this formulation, i.e. between the indices 2M and 4M−1. The above formulae relate coefficients $I_n$ with n=0 . . . M−1 and $\omega_n$ n=0, . . . , 2M−1 to the coefficients $\omega_n$ with n=0 . . . (E+2)M−1 of the downscaled synthesis window. As can be seen, $I_n$ with n=0 . . . M−1 actually merely depend on ¾ of the coefficients of the downsampled synthesis window, namely on $\omega_n$ with n=0 . . . (E+1)M−1, while $\omega_n$ n=0, . . . , 2M−1 depend on all $\omega_n$ with n=0 . . . (E+2)M−1.

As stated above, it might be that windower 18 obtains the downsampled synthesis window 54 $\omega_n$ with n=0 . . . (E+2)M−1 from a storage where the window coefficients $w_i$ of this downsampled synthesis window 54 have been stored after having been obtained using the downsampling 72, and from where same are read to compute coefficients $I_n$ with n=0 . . . M−1 and $\omega_n$ n=0, . . . , 2M−1 using the above relation, but alternatively, winder 18 may retrieve the coefficients $I_n$ with n=0 . . . M−1 and $\omega_n$ n=0, . . . , 2M−1, thus computed from the pre-downsampled synthesis window, from the storage directly. Alternatively, as stated above, the audio decoder 10 may comprise the segmental downsampler 76 performing the downsampling 72 of FIG. 6 on the basis of the reference synthesis window 70, thereby yielding $\omega_n$ with n=0 . . . (E+2)M−1 on the basis of which the windower 18 computes coefficients $I_n$ with n=0 . . . M−1 and $\omega_n$ n=0, . . . , 2M−1 using above relation/formulae. Even using the lifting implementation, more than one value for F may be supported.

Briefly summarizing the lifting implementation, same results in an audio decoder 10 configured to decode an audio signal 22 at a first sampling rate from a data stream 24 into which the audio signal is transform coded at a second sampling rate, the first sampling rate being $1/F^{th}$ of the second sampling rate, the audio decoder 10 comprising the receiver 12 which receives, per frame of length N of the audio signal, N spectral coefficients 28, the grabber 14 which grabs-out for each frame, a low-frequency fraction of length N/F out of the N spectral coefficients 28, a spectral-to-time modulator 16 configured to subject, for each frame 36, the low-frequency fraction to an inverse transform having modulation functions of length 2·N/F temporally extending over the respective frame and a previous frame so as to obtain a temporal portion of length 2·N/F, and a windower 18 which windows, for each frame 36, the temporal portion $x_{k,n}$ according to $z_{k,n}=\omega_n x_{k,n}$ for n=0, . . . , 2M−1 so as to obtain a windowed temporal portion $z_{k,n}$ with n=0 . . . 2M−1. The time domain aliasing canceler 20 generates intermediate temporal portions $m_k(0)$, . . . $m_k(M-1)$ according to $m_{k,n}=z_{k,n}+z_{k-1,n+M}$ for n=0, . . . , M−1. Finally, the lifter 80 computes frames $u_{k,n}$ of the audio signal with n=0 . . . M−1 according to $u_{k,n}=m_{k,n}+I_{n-M/2}\cdot m_{k-1,M-1-n}$ for n=M/2, . . . , M−1, and $u_{k,n}=m_{k,n}+I_{M-1-n}\cdot \text{out}_{k-1,M-1-n}$ for n=0, . . . ,M/2−1, wherein $I_n$ with n=0 . . . M−1 are lifting coefficients, wherein the inverse transform is an inverse MDCT or inverse MDST, and wherein $I_n$ with n=0 . . . M−1 and $\omega_n$ $n=0, \ldots, 2M-1$ depend on coefficients $\omega_n$ with n 10=0 . . . (E+2)M−1 of a synthesis window, and the synthesis window is a downsampled version of a reference synthesis window of length 4·N, downsampled by a factor of F by a segmental interpolation in segments of length ¼ ·N.

Figure 7:
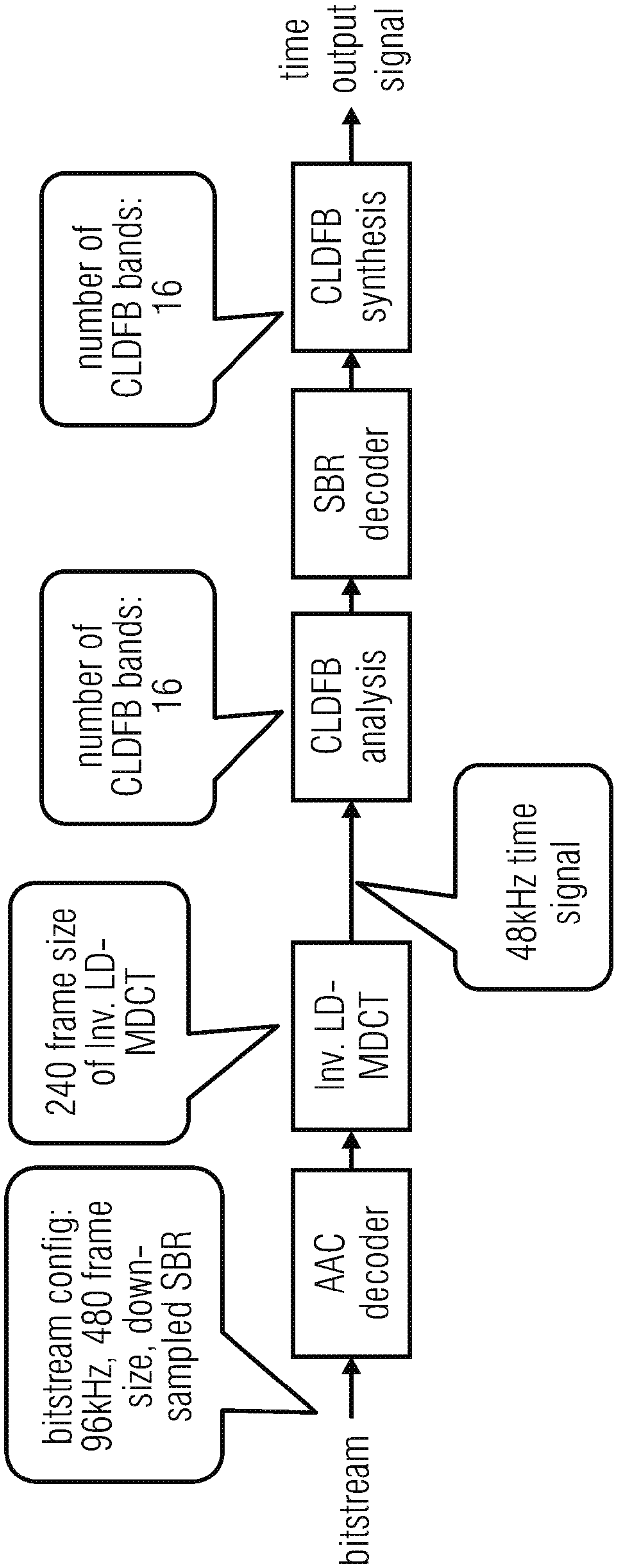
FIG. 7 shows a block diagram illustrating a downscaled operation of AAC-ELD including the low delay SBR tool.

It already turned out from the above discussion of a proposal for an extension of AAC-ELD with respect to a downscaled decoding mode that the audio decoder of FIG. 2 may be accompanied with a low delay SBR tool. The following outlines, for instance, how the AAC-ELD coder extended to support the above-proposed downscaled operating mode, would operate when using the low delay SBR tool. As already mentioned in the introductory portion of the specification of the present application, in case the low delay SBR tool is used in connection with the AAC-ELD coder, the filter banks of the low delay SBR module are downscaled as well. This ensures that the SBR module operates with the same frequency resolution and therefore no more adaptations are required. FIG. 7 outlines the signal path of the AAC-ELD decoder operating at 96 kHz, with frame size of 480 samples, in down-sampled SBR mode and with a downscaling factor F of 2.

In FIG. 7, the bitstream arriving as processed by a sequence of blocks, namely an AAC decoder, an inverse LD-MDCT block, a CLDFB analysis block, an SBR decoder and a CLDFB synthesis block (CLDFB=complex low delay filter bank). The bitstream equals the data stream 24 discussed previously with respect to FIGS. 3 to 6, but is additionally accompanied by parametric SBR data assisting the spectral shaping of a spectral replicate of a spectral extension band extending the spectra frequency of the audio signal obtained by the downscaled audio decoding at the output of the inverse low delay MDCT block, the spectral shaping being performed by the SBR decoder. In particular, the AAC decoder retrieves all of the used syntax elements by appropriate parsing and entropy decoding. The AAC decoder may partially coincide with the receiver 12 of the audio decoder 10 which, in FIG. 7, is embodied by the inverse low delay MDCT block. In FIG. 7, F is exemplarily equal to 2. That is, the inverse low delay MDCT block of FIG. 7 outputs, as an example for the reconstructed audio signal 22 of FIG. 2, a 48 kHz time signal downsampled at half the rate at which the audio signal was originally coded into the arriving bitstream. The CLDFB analysis block subdivides this 48 kHz time signal, i.e. the audio signal obtained by downscaled audio decoding, into N bands, here N=16, and the SBR decoder computes re-shaping coefficients for these bands, re-shapes the N bands accordingly—controlled via the SBR data in the input bitstream arriving at the input of the AAC decoder, and the CLDFB synthesis block re-transitions from spectral domain to time domain with obtaining, thereby, a high frequency extension signal to be added to the original decoded audio signals output by the inverse low delay MDCT block.

Please note, that the standard operation of SBR utilizes a 32 band CLDFB. The interpolation algorithm for the 32 band CLDFB window coefficients $ci_{32}$ is already given in 4.6.19.4.1 in [1], $$ci_{32}(i) = \frac{1}{2}[c_{64}(2i+1) + c_{64}(2i)],\ 0 \le i < 320,$$

where $c_{64}$ are the window coefficients of the 64 band window given in Table 4.A.90 in [1]. This formula can be further generalized to define window coefficients for a lower number of bands B as well $$ci_B(i) = \frac{1}{2}[c_{64}(2F\cdot i + 1 + p) + c_{64}(2F\cdot i + p)],$$

$$0 \le i < (10B),\ p = \mathrm{int}\left(\frac{64}{2B} - 0.5\right)$$

where F denotes the downscaling factor being F=32/B. With this definition of the window coefficients, the CLDFB analysis and synthesis filter bank can be completely described as outlined in the above example of section A.2.

Thus, above examples provided some missing definitions for the AAC-ELD codec in order to adapt the codec to systems with lower sample rates. These definitions may be included in the ISO/IEC 14496-3:2009 standard.

Thus, in the above discussion it has, inter alias, been described:

An audio decoder may be configured to decode an audio signal at a first sampling rate from a data stream into which the audio signal is transform coded at a second sampling rate, the first sampling rate being $1/F^{th}$ of the second sampling rate, the audio decoder comprising: a receiver configured to receive, per frame of length N of the audio signal, N spectral coefficients; a grabber configured to grab-out for each frame, a low-frequency fraction of length N/F out of the N spectral coefficients; a spectral-to-time modulator configured to subject, for each frame, the low-frequency fraction to an inverse transform having modulation functions of length (E+2)·N/F temporally extending over the respective frame and E+1 previous frames so as to obtain a temporal portion of length (E+2)·N/F; a windower configured to window, for each frame, the temporal portion using a unimodal synthesis window of length (E+2)·N/F comprising a zero-portion of length ¼ ·N/F at a leading end thereof and having a peak within a temporal interval of the unimodal synthesis window, the temporal interval succeeding the zero-portion and having length 7/4·N/F so that the windower obtains a windowed temporal portion of length (E+2)·N/F; and a time domain aliasing canceler configured to subject the windowed temporal portion of the frames to an overlap-add process so that a trailing-end fraction of length (E+1)/(E+2) of the windowed temporal portion of a current frame overlaps a leading end of length (E+1)/(E+2) of the windowed temporal portion of a preceding frame, wherein the inverse transform is an inverse MDCT or inverse MDST, and wherein the unimodal synthesis window is a downsampled version of a reference unimodal synthesis window of length (E+2)·N, downsampled by a factor of F by a segmental interpolation in segments of length ¼ ·N/F.

Audio decoder according to an embodiment, wherein the unimodal synthesis window is a concatenation of spline functions of length ¼ ·N/F.

Audio decoder according to an embodiment, wherein the unimodal synthesis window is a concatenation of cubic spline functions of length ¼ ·N/F.

Audio decoder according to any of the previous embodiments, wherein E=2.

Audio decoder according to any of the previous embodiments, wherein the inverse transform is an inverse MDCT.

Audio decoder according to any of the previous embodiments, wherein more than 80% of a mass of the unimodal synthesis window is comprised within the temporal interval succeeding the zero-portion and having length 7/4·N/F.

Audio decoder according to any of the previous embodiments, wherein the audio decoder is configured to perform the interpolation or to derive the unimodal synthesis window from a storage.

Audio decoder according to any of the previous embodiments, wherein the audio decoder is configured to support different values for F.

Audio decoder according to any of the previous embodiments, wherein F is between 1.5 and 10, both inclusively.

A method performed by an audio decoder according to any of the previous embodiments.

A computer program having a program code for performing, when running on a computer, a method according to an embodiment.

As far as the term "of . . . length" is concerned it should be noted that this term is to be interpreted as measuring the length in samples. As far as the length of the zero portion and the segments is concerned it should be noted that same may be integer valued. Alternatively, same may be non-integer valued.

As to the temporal interval within which the peak is positioned it is noted that FIG. 1 shows this peak as well as the temporal interval illustratively for an example of the reference unimodal synthesis window with E=2 and N=512: The peak has its maximum at approximately sample No. 1408 and the temporal interval extends from sample No. 1024 to sample No. 1920. The temporal interval is, thus, ⅞ of the DCT kernel long.

As to the term "downsampled version" it is noted that in the above specification, instead of this term, "downscaled version" has synonymously been used.

As to the term "mass of a function within a certain interval" it is noted that same shall denote the definite integral of the respective function within the respective interval.

In case of the audio decoder supporting different values for F, same may comprise a storage having accordingly segmentally interpolated versions of the reference unimodal synthesis window or may perform the segmental interpolation for a currently active value of F. The different segmentally interpolated versions have in common that the interpolation does not negatively affect the discontinuities at the segment boundaries. They may, as described above, spline functions.

By deriving the unimodal synthesis window by a segmental interpolation from the reference unimodal synthesis window such as the one shown in FIG. 1 above, the 4·(E+2) segments may be formed by spline approximation such as by cubic splines and despite the interpolation, the discontinuities which are to be present in the unimodal synthesis window at a pitch of ¼·N/F owing to the synthetically introduced zero-portion as a means for lowering the delay are conserved.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

REFERENCES

[1] ISO/IEC 14496-3:2009

[2] M13958, "Proposal for an Enhanced Low Delay Coding Mode", October 2006, Hangzhou, China

The invention claimed is:

1. Audio decoder configured to decode an audio signal at a first sampling rate from a data stream into which the audio signal is transform coded at a second sampling rate, the first sampling rate being $1/F^{th}$ of the second sampling rate, the audio decoder comprising:

a receiver configured to receive, per frame of length N of the audio signal, N spectral coefficients;

a grabber configured to grab-out for each frame, a low-frequency fraction of length N/F out of the N spectral coefficients;

a spectral-to-time modulator configured to subject, for each frame, the low-frequency fraction to an inverse transform having modulation functions of length (E+2)·N/F temporally extending over the respective frame and E+1 previous frames so as to obtain a temporal portion of length (E+2)·N/F;

a windower configured to window, for each frame, the temporal portion using a synthesis window of length (E+2)·N/F comprising a zero-portion of length 1/4·N/F at a leading end thereof and having a peak within a temporal interval of the synthesis window, the temporal interval succeeding the zero-portion and having length 7/4·N/F so that the windower obtains a windowed temporal portion of length (E+2)·N/F; and a time domain aliasing canceler configured to subject the windowed temporal portion of the frames to an overlap-add process so that a trailing-end fraction of length (E+1)/(E+2) of the windowed temporal portion of a current frame overlaps a leading end of length (E+1)/(E+2) of the windowed temporal portion of a preceding frame, wherein the inverse transform is an inverse MDCT or inverse MDST, and wherein the synthesis window is a downsampled version of a reference synthesis window of length (E+2)·N, downsampled by a factor of F by a segmental interpolation in segments of length 1/4·N, wherein the synthesis window is a concatenation of spline functions of length 1/4·N/F, and wherein the receiver is configured to use entropy decoding in order to read the spectral coefficients from the data stream and spectrally shape the spectral coefficients with scale factors provided in the data stream or scale factors derived by linear prediction coefficients conveyed within data stream.

2. Audio decoder according to claim 1, wherein the audio decoder is configured to support different values for F.

3. Audio decoder according to claim 1, wherein F is between 1.5 and 10, both inclusively.

4. Audio decoder according to claim 1, wherein the reference synthesis window is unimodal.

5. Audio decoder according to claim 1, wherein the audio decoder is configured to perform the interpolation in such a manner that a majority of the coefficients of the synthesis window depends on more than two coefficients of the reference synthesis window.

6. Audio decoder according to claim 1, wherein the windower and the time domain aliasing canceller cooperate so that the windower skips the zero-portion in weighting the temporal portion using the synthesis window and the time domain aliasing canceler disregards a corresponding non-weighted portion of the windowed temporal portion in the overlap-add process so that merely E+1 windowed temporal portions are summed-up so as to result in the corresponding non-weighted portion of a corresponding frame and E+2 windowed portions are summed-up within a reminder of the corresponding frame.

* * * * *